(12) United States Patent
Fiorenza et al.

(10) Patent No.: US 6,774,530 B2
(45) Date of Patent: Aug. 10, 2004

(54) WINDING ASSEMBLIES FOR ELECTRICAL MACHINES

(75) Inventors: John A. Fiorenza, Slinger, WI (US); Felix Belkin, Glendale, WI (US); Deborah E. Cukjati, West Allis, WI (US); Dave M. Rose, New Berlin, WI (US); Tim J. Vetta, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 11 days.

(21) Appl. No.: 10/165,111

(22) Filed: Jun. 7, 2002

(65) Prior Publication Data

US 2003/0227229 A1 Dec. 11, 2003

(51) Int. Cl.⁷ .............................. H02K 1/22; H02K 3/26
(52) U.S. Cl. ...................... 310/268; 310/42; 310/195; 310/207; 310/261
(58) Field of Search ................................ 310/179–180, 310/184, 195, 203, 207, 208, 254, 261, 268, 42

(56) References Cited

U.S. PATENT DOCUMENTS

| | | | |
|---|---|---|---|
| 2,502,068 A | 3/1950 | Anderson | 310/268 |
| 3,144,574 A | 8/1964 | Henry-Baudot | 310/268 |
| 3,171,051 A * | 2/1965 | Burr | 310/268 |
| 3,231,774 A * | 1/1966 | Henry-Baudot | 310/268 |
| 3,292,024 A | 12/1966 | Kober | 310/201 |
| 3,296,474 A * | 1/1967 | Henry-Baudot | 310/268 |
| 3,382,570 A | 5/1968 | Knapp et al. | 29/598 |
| 3,488,539 A | 1/1970 | Tucker | 310/268 |
| 3,500,095 A | 3/1970 | Keogh | 310/268 |
| 3,568,727 A | 3/1971 | Weiss et al. | 83/50 |
| 3,790,835 A * | 2/1974 | Takeda | 310/268 |
| 3,989,969 A | 11/1976 | Lazaroiu et al. | 310/268 |
| 4,228,384 A | 10/1980 | Arnold, Jr. et al. | 318/254 |
| 4,336,474 A | 6/1982 | Davey | 310/179 |
| 4,341,973 A | 7/1982 | Maruko et al. | 310/268 |
| 4,346,320 A | 8/1982 | Davey | 310/179 |
| 4,500,806 A | 2/1985 | Kanayama et al. | 310/268 |
| 4,501,986 A | 2/1985 | Gheorghe | 310/268 |
| 4,629,917 A | 12/1986 | Brem | 310/59 |

(List continued on next page.)

FOREIGN PATENT DOCUMENTS

| | | | |
|---|---|---|---|
| GB | 2346266 A | 2/2000 | ............ H02K/5/08 |
| WO | WO 01/11755 A1 | 2/2001 | ............ H02K/1/27 |
| WO | WO 01/47089 A2 | 6/2001 | |

OTHER PUBLICATIONS

D. Patterson and R. Spée, IEEE Transactions on Industry Applications, Sep./Oct. 1995, vol. 31, No. 5, The Design and Development of an Axial Flux Permanent Magnet Brushless DC Motor for Wheel Drive In a Solar Powered Vehicle, pp. 1054–1061.

S. Camilleri, et al., Journal of Electrical & Electronics Engineering, Australia, vol. 20, No. 1, 2000, Development of a Silent Brushless DC Motor Drive, pp. 23–28.

(List continued on next page.)

Primary Examiner—Burton Mullins
(74) Attorney, Agent, or Firm—Michael Best & Friedrich, LLP

(57) ABSTRACT

Winding assemblies of electrical machines, such as electric motors, are provided which include a connector scheme having at least one conduit that is electrically coupled via a wave soldered connection directly to at least two windings which are not axially adjacent. The conduit can include a common connector and/or a phase connector. The connector scheme can additionally or alternatively include a power connector that is electrically coupled via wave soldering directly to a single winding, and adapted to be electrically coupled to a power source. The winding assemblies of the invention can additionally provide a number of constructions which allow for minimally sized air gaps.

87 Claims, 15 Drawing Sheets

U.S. PATENT DOCUMENTS

| | | | | |
|---|---|---|---|---|
| 4,689,023 A | * | 8/1987 | Strong et al. | 310/71 |
| 4,823,039 A | | 4/1989 | Lynch | 310/268 |
| 5,177,392 A | | 1/1993 | Scott | 310/268 |
| 5,349,259 A | | 9/1994 | Kaneko et al. | 310/261 |
| 5,623,178 A | * | 4/1997 | Kawabata et al. | 310/71 |
| 5,729,068 A | | 3/1998 | Gasparini et al. | 310/179 |
| 5,773,905 A | * | 6/1998 | Hill | 310/201 |
| 5,789,840 A | | 8/1998 | Gould et al. | 310/179 |
| 5,789,841 A | | 8/1998 | Wang | 310/179 |
| 5,804,905 A | | 9/1998 | Knoerzer | 310/268 |
| 5,955,810 A | | 9/1999 | Umeda et al. | 310/208 |
| 5,982,074 A | | 11/1999 | Smith et al. | 310/261 |
| 5,998,903 A | | 12/1999 | Umeda et al. | 310/179 |
| 6,040,645 A | | 3/2000 | Lynch | 310/58 |
| 6,132,186 A | | 10/2000 | Cooper et al. | 417/423.7 |
| 6,137,203 A | | 10/2000 | Jermakian et al. | 310/191 |
| 6,140,735 A | | 10/2000 | Kato et al. | 310/201 |
| 6,147,432 A | | 11/2000 | Kusase et al. | 310/260 |
| 6,191,508 B1 | | 2/2001 | Aoki et al. | 310/45 |
| 6,204,586 B1 | | 3/2001 | Umeda et al. | 310/179 |
| 6,246,146 B1 | | 6/2001 | Schiller | 310/268 |
| 6,252,326 B1 | | 6/2001 | Umeda et al. | 310/179 |
| 6,252,327 B1 | | 6/2001 | Matsuzaki | 310/201 |
| 6,326,715 B1 | | 12/2001 | Asao et al. | 310/180 |
| 6,333,579 B1 | | 12/2001 | Hirano et al. | 310/194 |
| 6,600,244 B2 | * | 7/2003 | Okazaki | 310/71 |

OTHER PUBLICATIONS

D.J. Patterson, Recent Advances in the Design and Construction of Axial Flux Permanent Magnet Machines, Proceedings, IEAust Summit, Darwin 1996, pp. 435–440.

Axial Air Gap Motors on the Market, 13 pages, at least as early as Oct. 2, 2000 http://www.ibc-blackheath.pwp.blueyonder.co.uk/, http://www.ibc-blackheath.pwp.blueyonder.co.uk/bla2.htm, http://www.ibc-blackheath.pwp.blueyonder.co.uk/bla3.htm, http://www.ibc-blackheath.pwp.blueyonder.co.uk/bla10.htm.

* cited by examiner

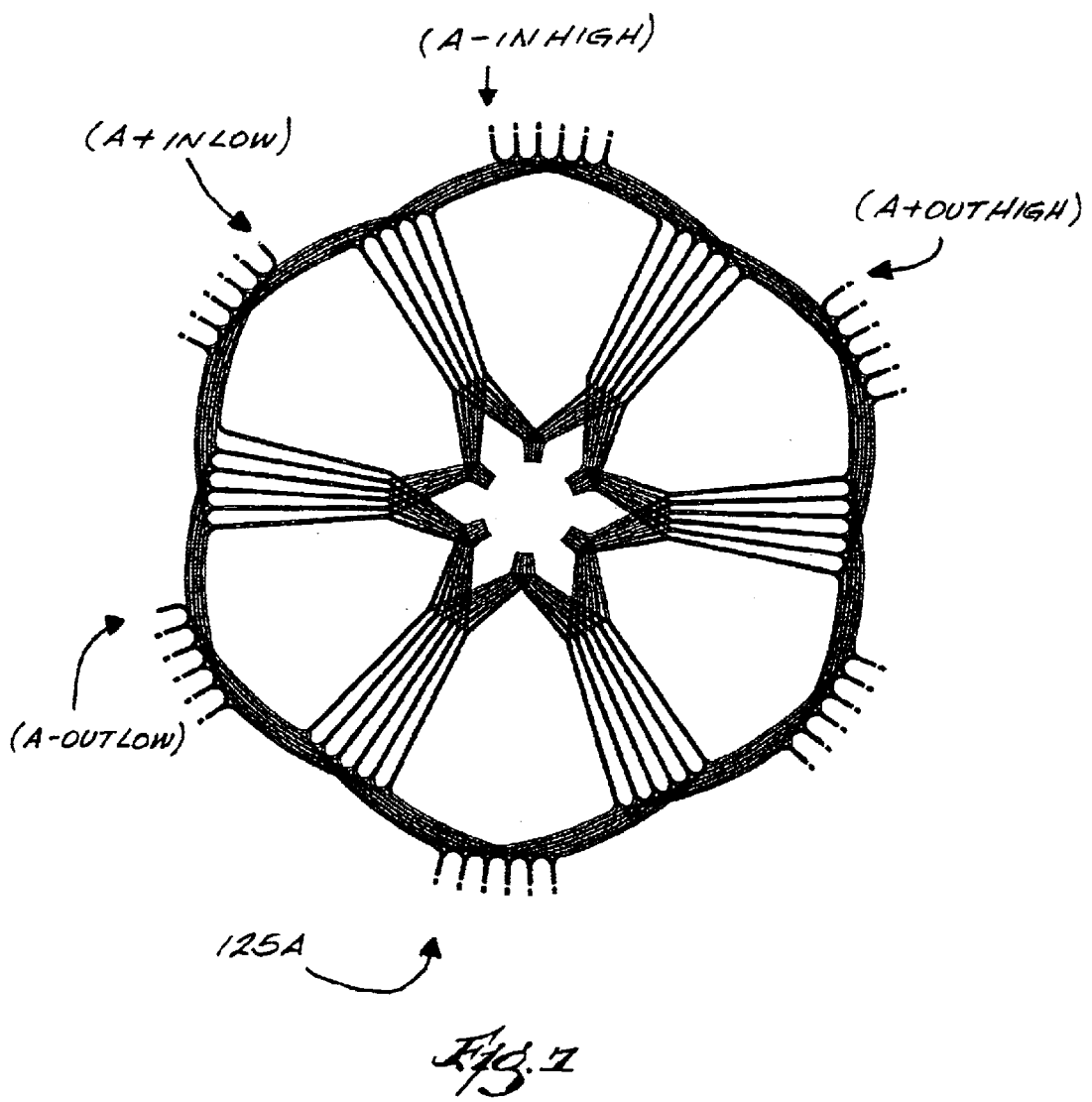
FIG. I

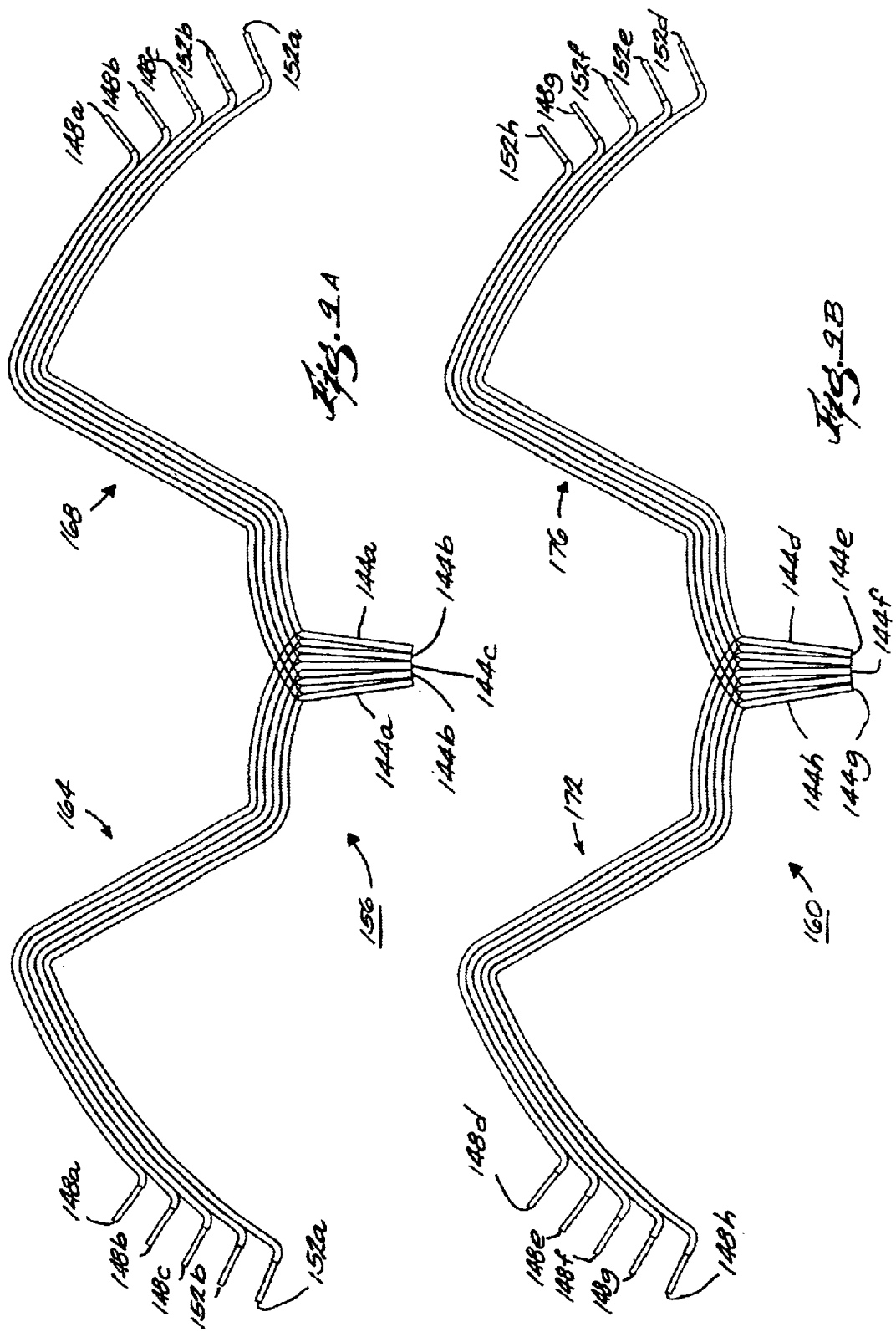

WINDING ASSEMBLIES FOR ELECTRICAL MACHINES

BACKGROUND OF THE INVENTION

The invention relates to electrical machines which convert electrical energy into mechanical energy, or vice versa, such as electric motors and electric generators.

Winding assemblies often include a number of windings which are selectively electrically coupled via manual soldering to one another and/or to a power source associated with the electrical machine. Manual soldering typically increases the time it takes to manufacture a winding assembly, reduces the reliability of the winding assembly, and increases the costs associated with the winding assembly.

Winding assemblies also often include electrical conduits which are utilized to form connections between representative structures that need to be electrically coupled. Size and/or performance requirements of the winding assembly may necessitate placement of at least one electrical conduit in an air gap between a rotor and a stator of the electrical machine, resulting in reduced efficiency.

SUMMARY OF THE INVENTION

The invention provides winding assemblies which substantially alleviate one or more of the above-described and other problems with existing winding assemblies.

Each winding assembly of the invention may include a connector scheme having at least one electrical conduit or winding connector that is electrically coupled via a wave solder connection to at least two windings which are not axially adjacent. In one embodiment, the at least one winding connector includes a common connector that electrically couples a common portion of each phase of a poly-phase winding assembly to the corresponding common portion(s) of the other phase(s) of the poly-phase winding assembly. In another embodiment, the at least one winding connector includes at least one phase connector that electrically couples two windings from the same phase. The connector scheme may additionally or alternatively include at least one electrical conduit or power connector that is electrically coupled via a wave solder connection to a single winding, and adapted to be electrically coupled to a power source, preferably via an electrical conduit or power bus.

In most embodiments, the winding assembly includes an inner region and an outer region situated radially outward of the inner region. The outer region is the portion of the winding assembly which may be wave soldered during a wave soldering process. Each winding connector and/or power connector is generally situated with respect to the windings such that the portion(s) of the respective connector designed to be wave soldered to the corresponding winding(s) are wave soldered during the wave soldering process, and the remaining portion(s) of the connector are not wave soldered during the wave soldering process.

Use of at least some of the aspects of the above-described connector scheme results in a winding assembly that is more efficient to manufacture, less costly, and more reliable than existing winding assemblies.

The winding assemblies of the invention provide a number of constructions which allow for minimally sized air gaps even when size and/or performance requirements of the winding assembly would otherwise necessitate placement of at least one electrical conduit in an air gap between a rotor and a stator of the electrical machine. The winding assemblies of the invention include electrical conduits situated adjacent to the air gap instead of in the air gap.

In one embodiment, at least one recess is provided near the periphery of a winding assembly to accommodate at least one electrical conduit of the winding assembly. Each recess may extend around any portion of the circumference of the winding assembly (e.g., the entire circumference). Preferably, each recess is sized to accommodate the height and width of the at least one electrical conduit while minimizing the amount of winding elements removed from the winding assembly, such that the at least one electrical conduit does not extend into the air gap of the electrical machine or beyond an outer edge of the winding assembly.

In another embodiment, at least one recess is provided inboard of the periphery of a winding assembly to accommodate at least one electrical conduit of the winding assembly. Each recess may extend around any portion of the circumference of the winding assembly (e.g., the entire circumference). Preferably, each recess is sized to accommodate the height and width of the at least one electrical conduit while minimizing the amount of winding elements removed from the winding assembly, such that the at least one electrical conduit does not extend into the air gap of the electrical machine.

In another embodiment, magnetically permeable element(s) of the winding assembly extend beyond the edges of the windings adjacent to the air gap towards the corresponding magnetically-coupled elements (e.g., permanent magnets) to decrease the size of the air gap. The magnetically permeable elements preferable extend to accommodate at least the height of any electrical conduit extending beyond the edges of the windings adjacent to the air gap.

As is apparent from the above, it is an advantage of the invention to provide new and useful winding assemblies for electrical machines. Other features and advantages of the invention will become apparent by consideration of the detailed description and accompanying drawings.

BRIEF DESCRIPTION OF THE DRAWINGS

FIG. 7 illustrates the windings of an A phase winding group in the first embodiment.

FIG. 9A illustrates a symmetrical group of windings in the second embodiment.

FIG. 9B illustrates an asymmetrical group of windings in the second embodiment.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected," "coupled," and "mounted" and variations thereof herein are used broadly and, unless otherwise stated, encompass both direct and indirect connections, couplings, and mountings. In addition, the terms "connected" and "coupled" are not restricted to physical or mechanical connections or couplings.

Figure 1:
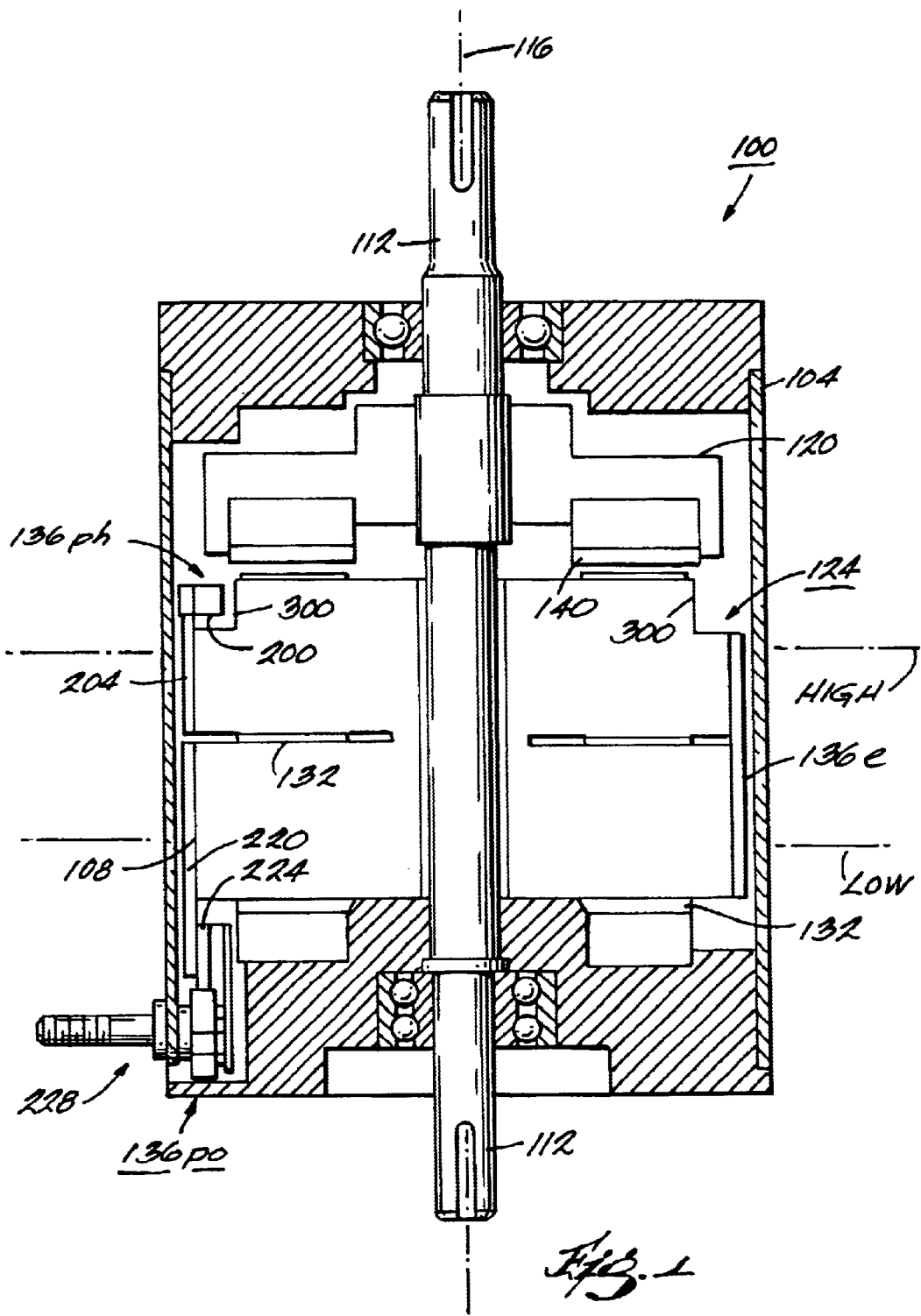
FIG. 1 illustrates a sectional view of an electric motor including a winding assembly of the invention.

FIG. 1 illustrates a sectional view of an electric motor 100 representative of the type of electric motor in which winding assemblies of the invention are designed for use. The motor 100 is a six-pole brushless DC axial air gap three phase electric motor. The winding assemblies of the invention can be used in other electric motors (e.g., radial air gap electric motors, other axial air gap electric motors, etc.), and the motor 100 is merely shown and described as an example of one such electric motor. Additionally, the winding assemblies of the invention can be used in other types of electrical machines which convert electrical energy into mechanical energy, or which convert mechanical energy into electrical energy (e.g., generators, alternators, dynamotors, etc.).

Figure 2:
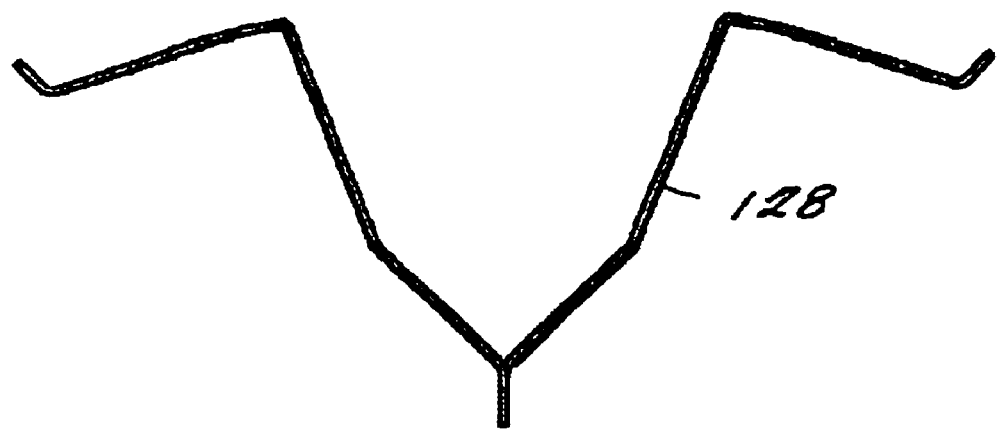
FIG. 2 illustrates a winding according to a first embodiment of the invention.

The motor 100 includes a housing 104, a stator 108 fixed relative to the housing 104, a shaft 112 rotatable about an axis 116, and a rotor 120 supported by the shaft 112 for rotation therewith relative to the stator 108. The stator 108 includes a winding assembly 124 having a plurality of windings (an example winding 128 is shown in FIG. 2), magnetic permeable element(s) 132 (e.g., stacked laminations, stamped pieces, a rolled core, a stamped core, etc., made of any magnetically permeable material such as steel, other ferromagnetic elements, etc.) situated with respect to the windings (e.g., windings 128), and electrical conduits or connectors (e.g., connectors 136c, 136e, 136ph, and 136po shown in FIG. 14) utilized to selectively electrically couple the windings (e.g., windings 128) to one another and/or to a power source associated with the motor 100 in accordance with the design of the motor 100.

A number of embodiments of the winding assembly 124 are discussed further below. Although the winding assembly 124 is shown included in the stator 108, the winding assemblies of the invention may be included in the rotor(s) and/or the stator(s) of any electrical machine. Because some electrical machines include more than one rotor and/or stator, more than one winding assembly may be utilized.

Generally, during operation of the motor 100, electrical conduits or power buses supply current to the winding assembly 124. The current flows through the winding assembly 124 thereby creating a rotating magnetic field in the magnetically permeable elements 132. The rotating magnetic field interacts with the magnetic field of permanent magnets 140 coupled to the rotor 120 to turn the rotor 120 and thereby turn the shaft 112.

Figure 3:
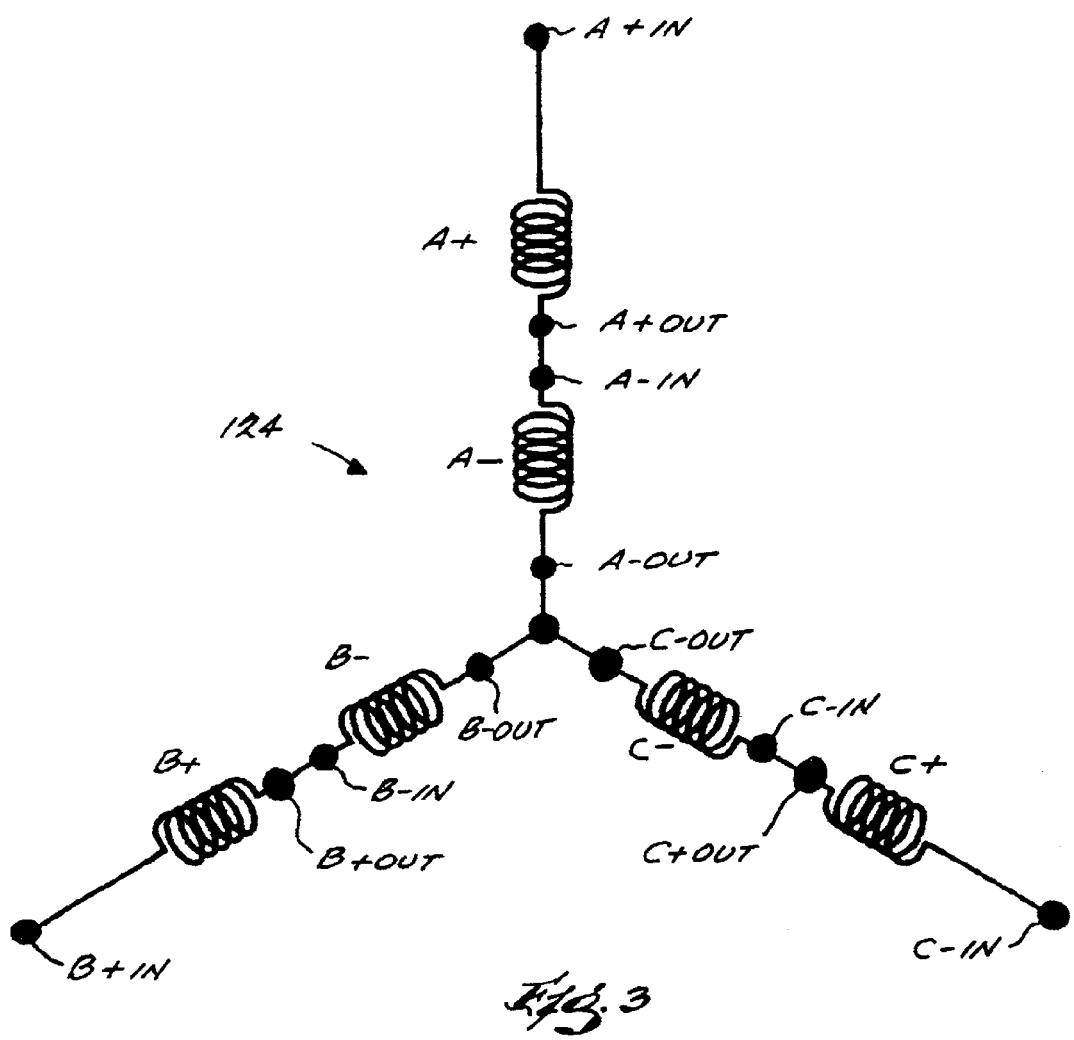
FIG. 3 illustrates connections for a wye configuration of the winding assembly of the invention.

A schematic representation of a connection scheme for one embodiment of the winding assembly 124 is shown in FIG. 3. The windings (e.g., windings 128) are grouped together to form winding groups (e.g., half phase winding groups, phase winding groups, and overall winding groups (each discussed further below)). The winding groups form in part the winding assembly 124. The winding assembly 124 includes three phases (e.g., A, B, and C), and each phase (e.g., A, B, and C), includes a negative half phase (e.g., A−, B−, and C−, respectively; and a positive half phase (e.g., A+, B+, and C+, respectively).

Each half phase winding group (e.g., 125A− and 125A+ shown in FIGS. 5 and 6, respectively; or 125I− and 125I+ shown in FIGS. 11 and 12, respectively) includes a first terminal IN (e.g., A− IN, A+ IN) and a second terminal OUT (e.g., A− OUT, A+ OUT). Each first terminal IN and second terminal OUT may be located in either a first plane HIGH (see FIG. 1) or a second plane LOW (see FIG. 1) of the winding assembly 124. Each first terminal IN and second terminal OUT is electrically coupled directly to one of the connectors 136 as discussed further below.

Figure 4:
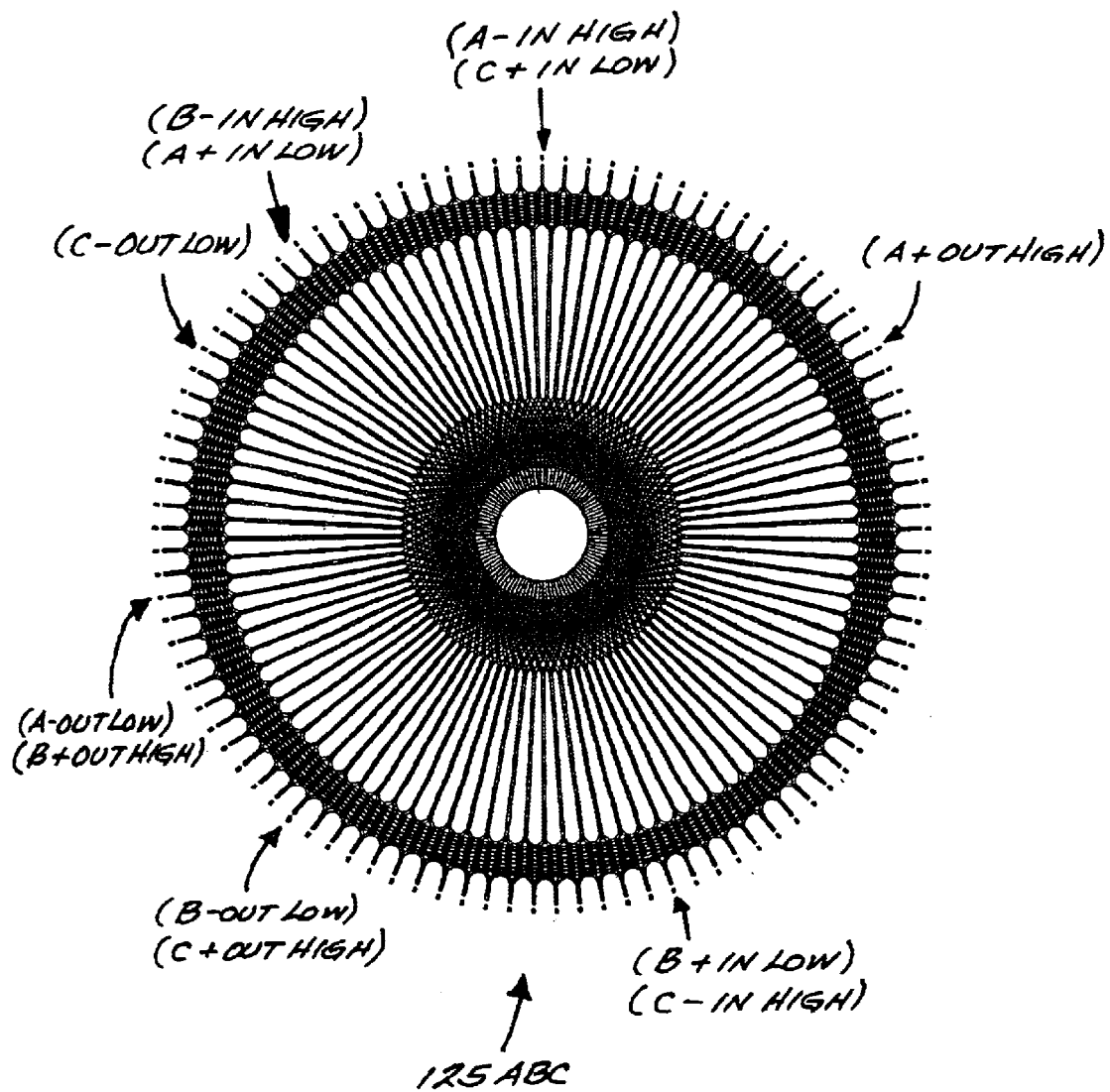
FIG. 4 illustrates the windings of an overall winding group in the first embodiment.
Figure 5:
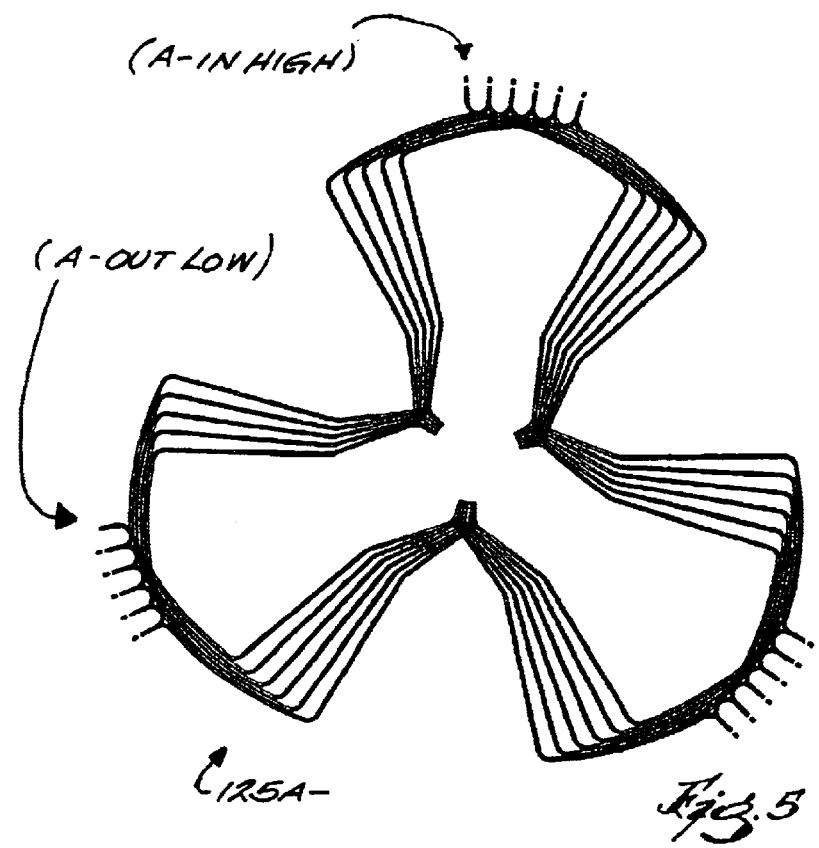
FIG. 5 illustrates the windings of an A– half phase winding group in the first embodiment.
Figure 6:
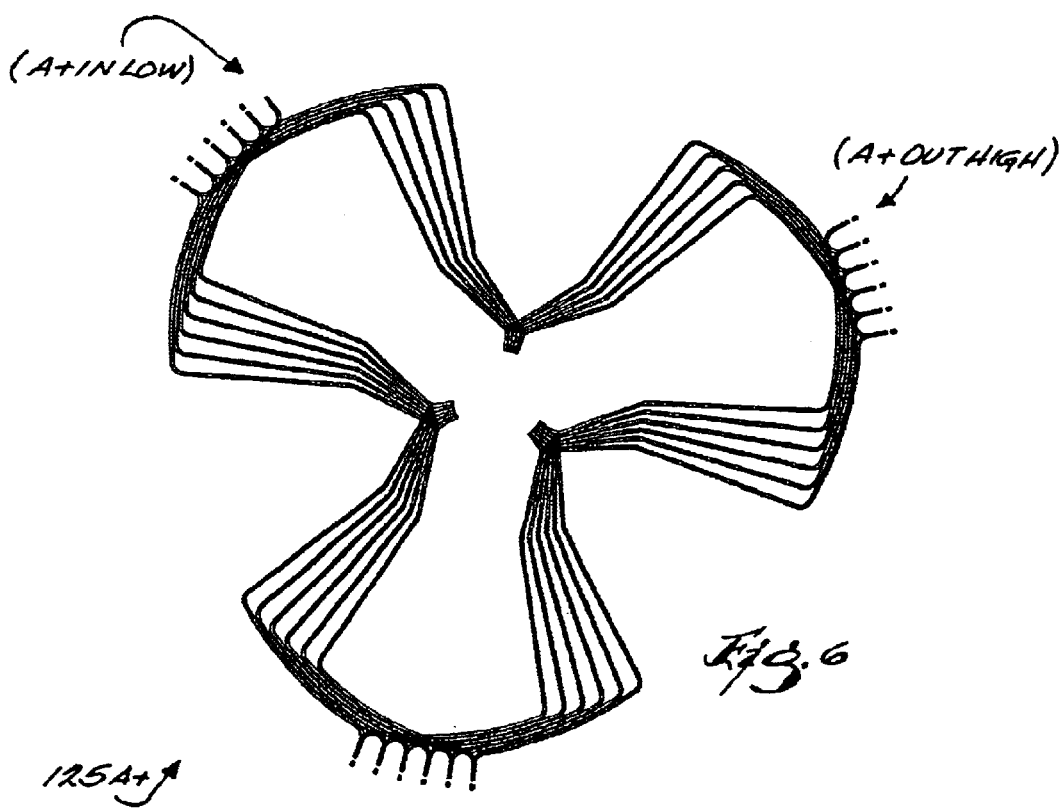
FIG. 6 illustrates the windings of an A+ half phase winding group in the first embodiment.

FIG. 4 is a top view of an overall winding group 125ABC that includes the phase winding groups of the A, B, and C phases (e.g., 125A as shown in FIG. 7). FIG. 5 illustrates the windings of the A− half phase winding group 125A− and FIG. 6 illustrates the windings of the A+ half phase winding group 125A+. The A phase winding group 125A illustrated in FIG. 7 includes the A− half phase winding group 125A− and the A+ half phase winding group 125A+. The B and C phase winding groups similarly include the respective negative half phase winding group and the positive half phase winding group of the B or C phase.

Figure 8:
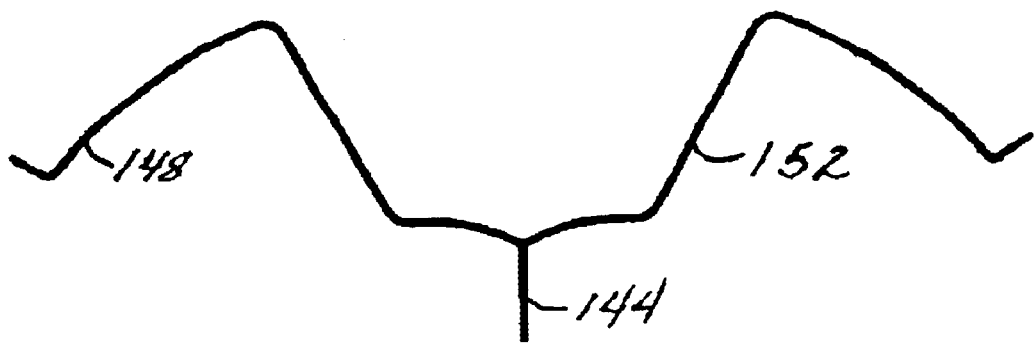
FIG. 8 illustrates a winding according to a second embodiment of the invention.

In another embodiment, the winding assembly 124 may utilize a plurality of windings 144 as illustrated in FIG. 8. Each winding 144 includes a first side 148 and a second side 152 (see FIGS. 9A and 9B). The windings 128 and 144 are preferably manufactured using a stamping process.

As illustrated in FIGS. 9A and 9B, the dimensions of the winding 144 can vary. Each winding 144 is designed so the spacing between grouped circumferentially adjacent windings is minimal, and so the windings 144 are correctly spaced about the periphery of the winding assembly to form connections in accordance with the design of the motor 100. A reduction in the spacing between the grouped circumferentially adjacent windings provides larger spaces between the groups of windings. Larger spaces allow for the use of more magnetically permeable element(s) 132 which generally increases the efficiency of the motor 100. The number of windings utilized, and the lengths of each side of the respective windings may vary.

With reference to FIGS. 9A and 9B, the windings 144 are grouped together to form symmetrical groupings 156 and asymmetrical groupings 160, respectively. The symmetrical groupings 156 and the asymmetrical groupings 160 are utilized to form winding groups 125 as discussed below. Each symmetrical grouping 156 includes windings 144a, 144b, and 144c, and each asymmetrical grouping 160 includes windings 144d, 144e, 144f, 144g, and 144h. As illustrated, the windings 144a and 144b are each utilized twice in the symmetrical grouping 156, but positioned in different orientations (i.e., the second sides 152a and 152b are circumferentially adjacent to the first sides 148a, 148b, and 148c; and the first sides 148a and 148b are circumferentially adjacent to the second sides 152a, 152b, and 152c). For FIGS. 9A and 9B, the letters a–f connote windings having different dimensions. The dimensions of the windings 144a–f are shown in Table 1 for one specific embodiment of the winding assembly 124 (i.e., the winding assembly 124 having 90 of the windings 144 and a diameter of 140 mm).

TABLE 1

|      | 148      | 152      |
|------|----------|----------|
| 144a | 80.96 mm | 85.79 mm |
| 144b | 82.14 mm | 84.56 mm |
| 144c | 83.34 mm | 83.34 mm |
| 144d | 78.12 mm | 85.79 mm |
| 144e | 79.31 mm | 84.59 mm |
| 144f | 80.50 mm | 83.34 mm |
| 144g | 82.14 mm | 81.71 mm |
| 144h | 80.96 mm | 82.94 mm |

Each symmetrical grouping 156 includes a first side 164 and a second side 168 where the first side 164 is symmetrical to the second side 168 (i.e., each winding portion located on the first side 164 includes a symmetrical winding portion on the second side 168). Each asymmetrical grouping 160 also includes a first side 172 and a second side 176, however, the first side 172 and the second side 176 are non-symmetrical. As illustrated, the first side 148d of the winding 144d located on the first side 172 does not include a symmetrical winding portion located on the second side 176, and the second side 152d of the winding 144d located on the second side 176 does not include a symmetrical winding portion located on the first side 172. All other winding portions included in the asymmetrical grouping 160 include symmetrical winding portions on the opposite side of the asymmetrical grouping 160.

As illustrated in FIGS. 10–13, the symmetrical groupings 156 and the asymmetrical groupings 160 are grouped together to form another embodiment of the winding groups 125 and the winding assembly 124.

Figure 10:
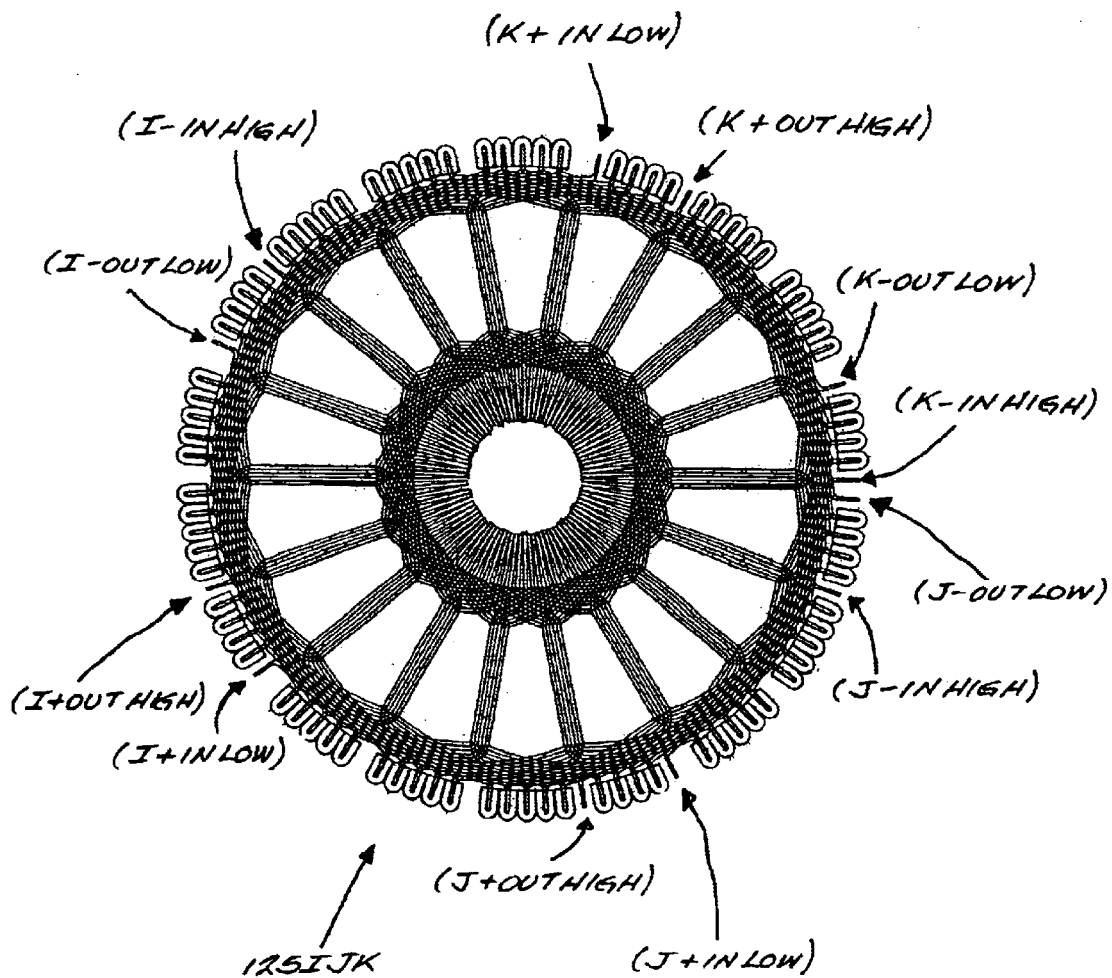
FIG. 10 illustrates the windings of an overall winding group in the second embodiment.
Figure 11:
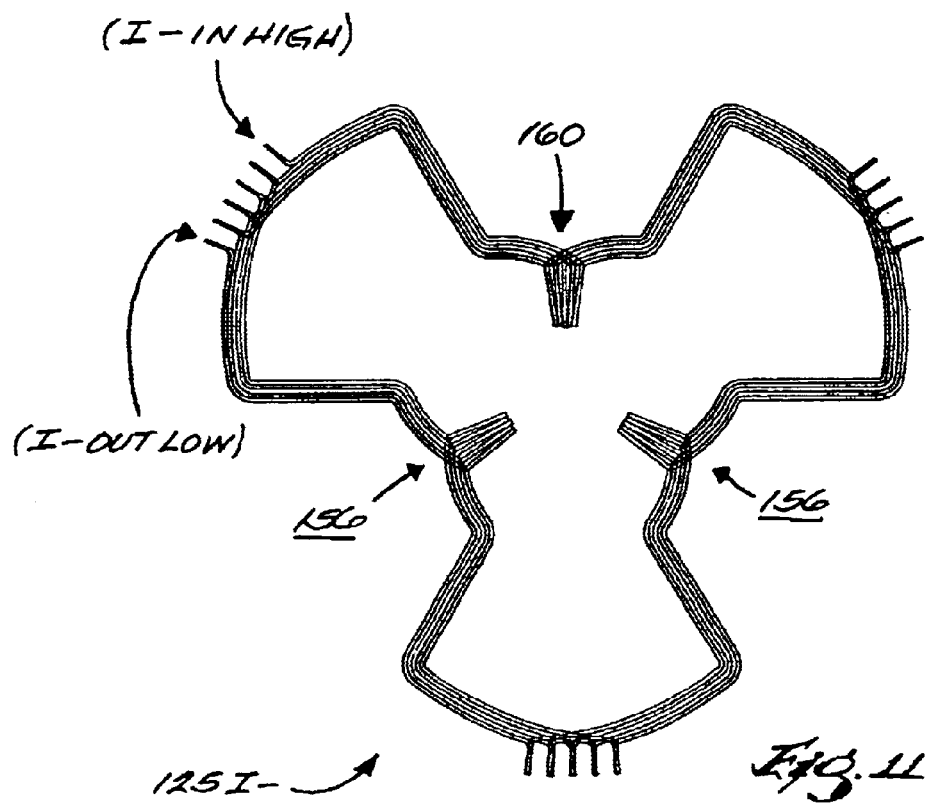
FIG. 11 illustrates the windings of an I– half phase winding group in the second embodiment.
Figure 12:
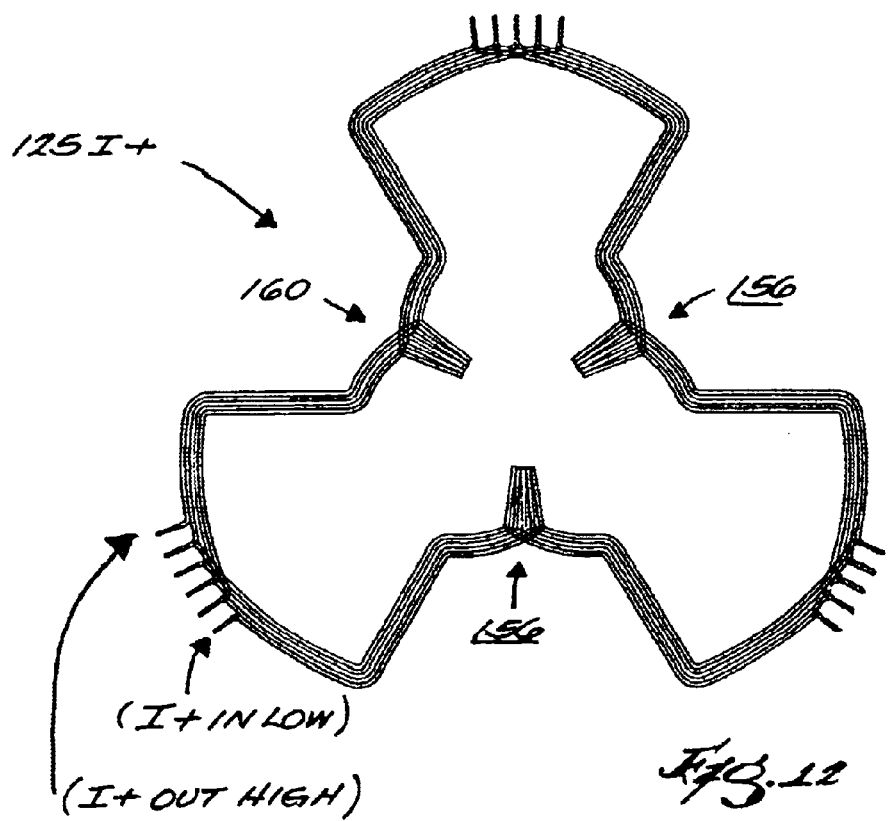
FIG. 12 illustrates the windings of an I+ half phase winding group in the second embodiment.
Figure 13:
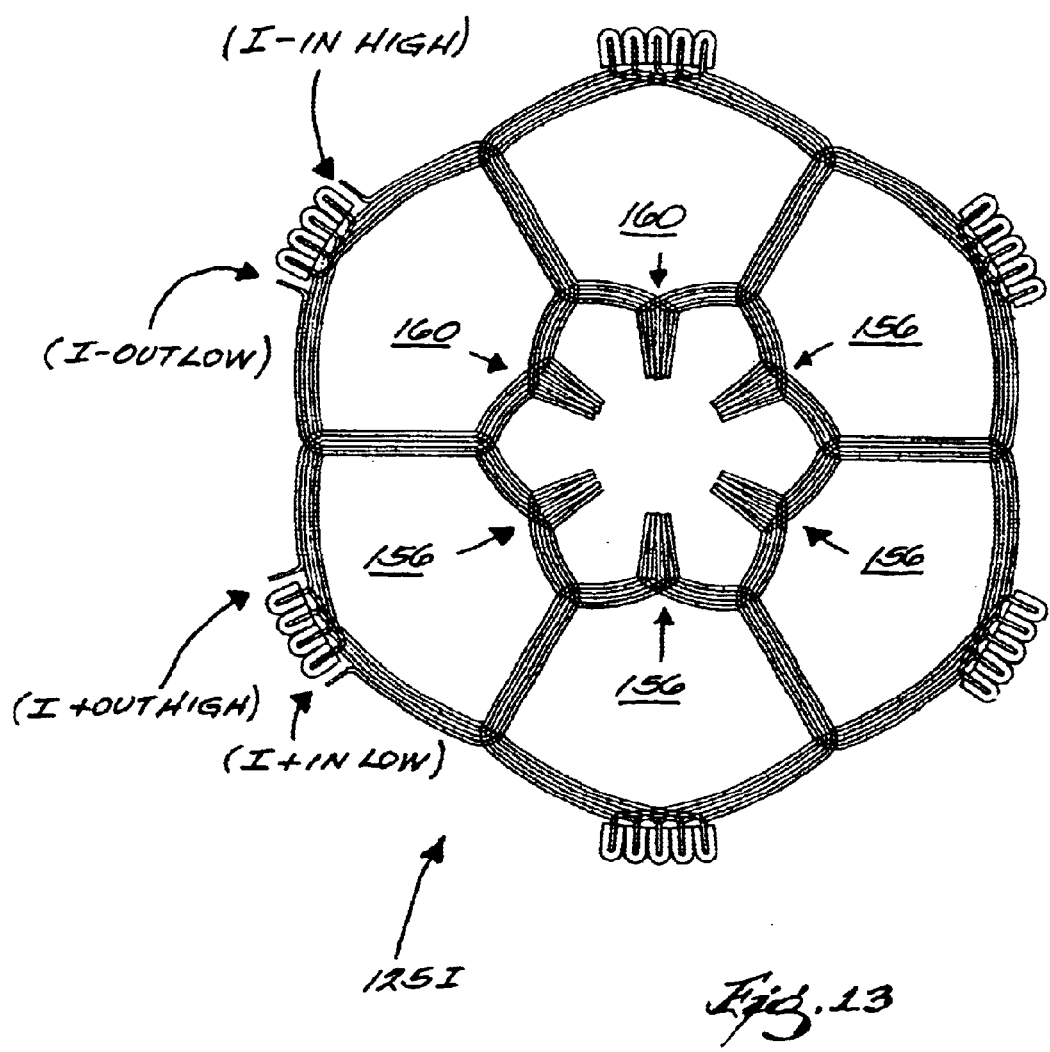
FIG. 13 illustrates the windings of an I phase winding group in the second embodiment.

FIG. 10 is a top view of an overall winding group 125IJK (with some of the end clips 136e discussed below) that includes the phase winding groups of the I, J, and K phases (e.g., 125I as shown in FIG. 13). FIG. 11 illustrates the windings 144 of the I– half phase winding group 125I– and FIG. 12 illustrates the windings 128 of the I+ half phase winding group 125I+. The I phase winding group 125I illustrated in FIG. 13 includes the I– half phase winding group 125I– and the I+ half phase winding group 125I+. The J and K phase winding groups similarly include the respective negative half phase winding group and the positive half phase winding group of the J or K phase.

In other alternative embodiments, the winding assembly 124 and/or another winding assembly of the invention may include a different number of the windings 128 or 144, a similar number or a different number of other windings formed using a stamping process similar to that utilized to form the windings 128 and 144, and other types of windings such as wave wound windings, wire wound winding, stamped windings, etc. Preferably, the windings utilized in the winding assemblies of the invention include radially extending or wave wound windings that are circumferentially spaced about the axis 116. For the remainder of the description below, it will be assumed that the winding assembly uses the windings 128.

Once the windings 128 are grouped together to form the respective half phase winding groups and phase winding groups, the connectors 136 are utilized to selectively electrically couple the windings 128 to one another and/or to the power source, and the magnetic permeable element(s) 132 are situated with respect to the windings 128.

FIG. 3 illustrates some of the connections necessary to form the winding assembly 124 in accordance with one design of the motor 100. The illustrated connections result in a wye configuration. However, in other embodiments, the design of the motor includes other connections (e.g., delta connections, single phase connections, dual phase connections, etc.). In addition to the connections shown in FIG. 3, the windings 128 of each half phase winding group are electrically coupled to one another.

Figure 14:
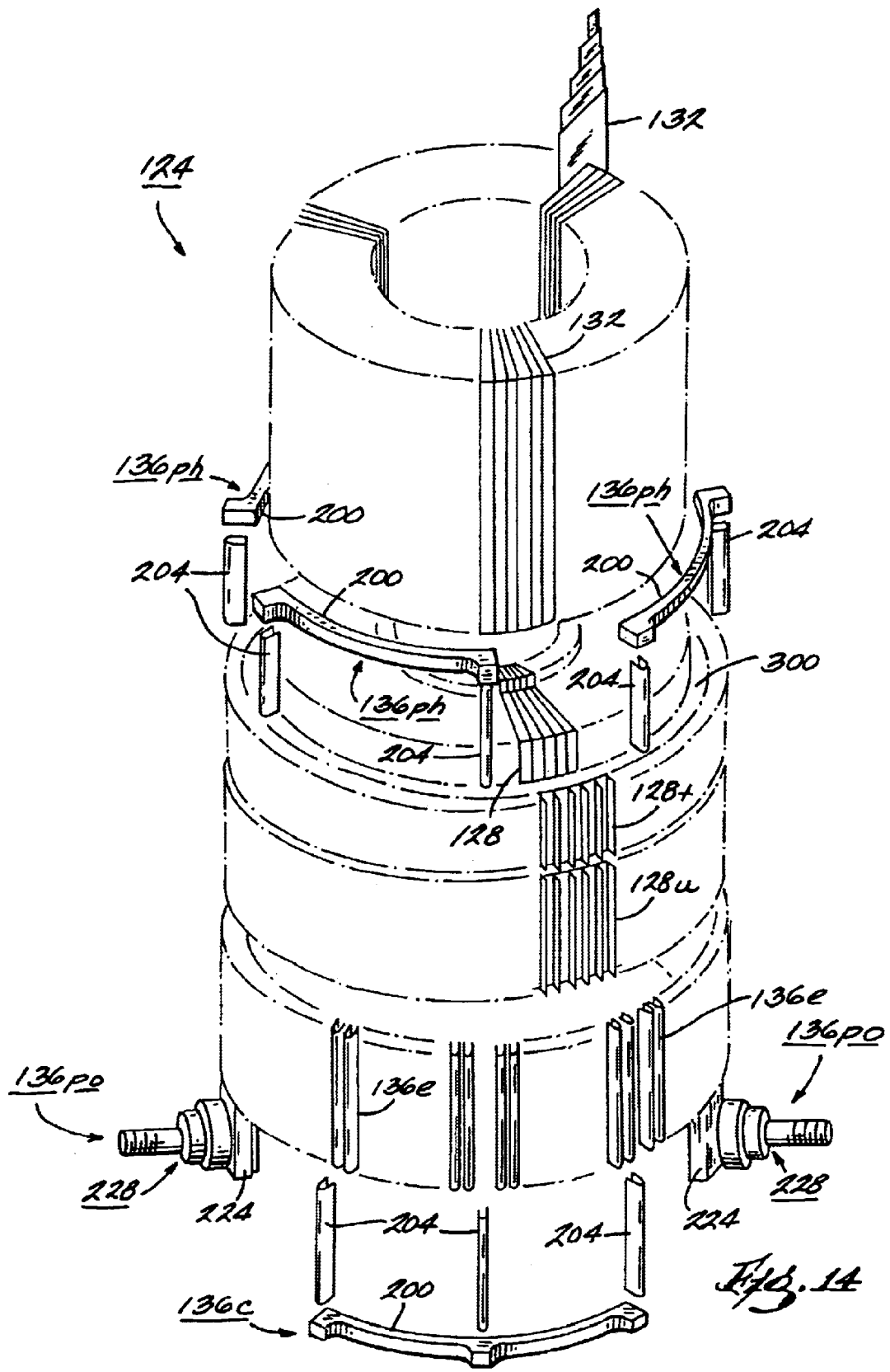
FIG. 14 is an exploded perspective view of the winding assembly of FIG. 1.
Figure 15:
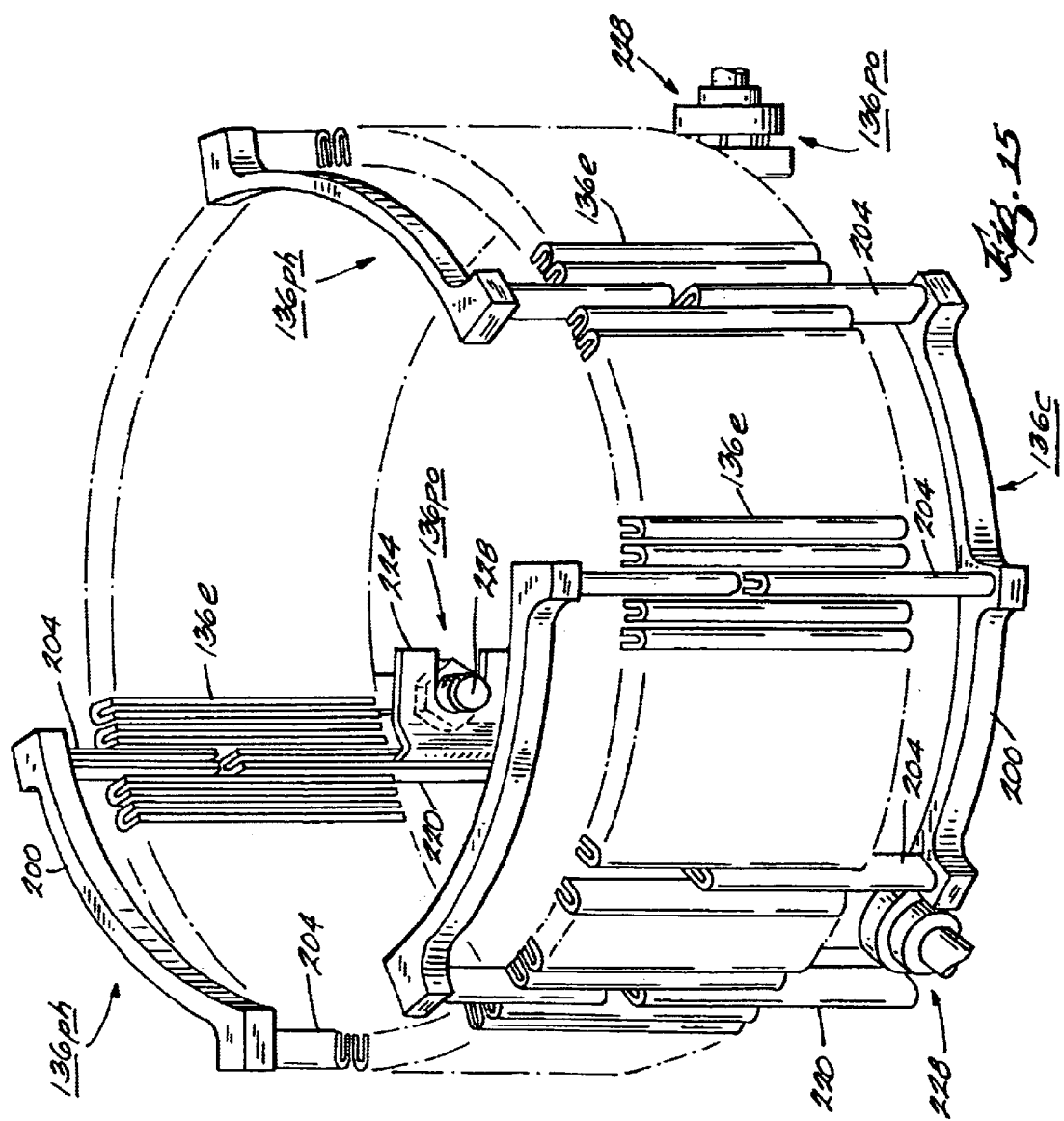
FIG. 15 is a perspective view of connectors of the winding assembly of FIG. 1.

FIG. 14 illustrates an exploded perspective view of one embodiment of the winding assembly 124, and FIG. 15 illustrates a perspective view of the connectors 136 of the winding assembly 124 shown in FIG. 14. End clips or connectors 136e are utilized to electrically couple axially adjacent windings 128. Generally, to be located axially adjacent to one another, two windings 128 must each include a portion which is located axially adjacent to the corresponding portion of the other winding (e.g., the winding 128t is axially adjacent to the winding 128u as illustrated in FIG. 14). During construction of the winding assembly 124, the end clips 136e are mechanically fixed to the corresponding windings 128 and then permanently electrically coupled, preferably via wave soldering, directly to each corresponding winding 128. Preferably, the end clips 136e are composed of electrically conductive elements and are adapted to receive the corresponding windings 128.

The winding assembly 124 also includes a number of connectors 136 that are utilized to electrically couple windings 128 which are not axially adjacent to one another. With reference to FIG. 4 (and FIG. 10), although a majority of the windings 128 that need to be electrically coupled to one another are situated axially adjacent to one another, the windings 128 that include the first terminal IN or the second terminal OUT are generally not located axially adjacent to the windings 128 that include the corresponding first terminal IN or second terminal OUT. Although the location of each first terminal IN and second terminal OUT can typically be adjusted by removing "dead" windings, the first terminal IN and the second terminal OUT commonly cannot be adjusted such that the corresponding windings 128 become axially adjacent to one another.

As used herein, "dead" windings are windings 128 that are not necessary to meet the design and/or performance requirements of the motor 100. Generally, a "dead" winding is either the first winding (i.e., the winding 128 that includes the original first terminal IN) or the last winding (i.e., the winding 128 that includes the original second terminal OUT) of a respective half phase winding group. In some constructions, a winding 128 other than, or in addition to, the first winding and/or the last winding of a respective half phase winding group may be removed as a "dead" winding if a connector 136 is utilized to electrically couple the two newly created portions of the half phase winding group that the removed winding 128 previously electrically coupled. Although removal of a "dead" winding may reduce the amount of current the winding assembly 124 can carry, removal of the winding 124 may result in a construction of the winding assembly 124 that is easier to manufacture.

A phase connector 136ph and a common connector 136c are two types of winding connectors or connectors 136 utilized to electrically couple windings 128 that are not axially adjacent to one another. Preferably, each winding connector 136ph and 136c includes a main portion 200 and at least two connector portions 204 where the main portion 200 couples the connector portions 204. The connector portions 204 preferably include a construction similar to the construction of the end clips 136e.

The connector portions 204 may be integral with the main portion 200 or coupled to the main portion 200, either permanently or removably. For example and in one embodiment, the connector portions 204 are soldered or welded to the main portion 200 such that a continuous electrical conduit is formed. In other embodiments, the connector portions 204 and the main portion 200 are formed from a single piece of an electrically conductive element (e.g., copper). In still other embodiments, the main portion 200 is removably coupled to the connector portions 204 via any number of connections (e.g., male tabs located on each of the connector portions and corresponding female tabs located on the main portion, etc.). Other arrangements are possible. The winding connectors 136ph and 136c illustrated in FIG. 14 include connector portions 204 separated from the main portions 200. The winding connectors 136ph and 136c illustrated in FIG. 15 include connector portions 204 coupled to the main portions 200.

Preferably, each winding connector 136ph and 136c is formed of rigid electrically conductive element(s). In alternative embodiments, the winding connectors 136ph and 136c are formed of non-rigid electrically conductive element(s) such as wire, or formed of a combination of rigid and non-rigid element(s). Additionally, each winding connector 136ph and 136c can include a coating that electrically insulates at least a portion of the respective winding connector 136ph and 136c from the remainder of the winding assembly 124. The winding connectors 136ph and 136c may be alternatively formed in other embodiments.

The phase connector 136ph electrically couples a first plurality of windings (e.g., the A+ half phase winding group 125 A+) to a second plurality of windings (e.g., the A− half phase winding group 125 A−). Although the illustrated phase connectors 136ph each electrically couple the positive half phase winding group of a particular phase to the negative half phase winding group of the same phase, the phase connectors 136ph may be utilized to connect first and second pluralities of windings that do not represent half phase winding groups (e.g., a phase may include two or three phase connectors 136ph). In most embodiments, one phase connector 136ph is utilized for each phase of a winding assembly (e.g., three phase connectors for a three phase winding assembly), and each phase connector 136ph includes two connector portions 204.

The common connector 136c electrically couples a common portion (e.g., the terminal A− OUT LO) of each phase (e.g., phase A) to the corresponding common portion(s) (e.g., the terminals B− OUT LO and C− OUT LO) of the other phase(s) (e.g., phase B and phase C). In most embodiments, a single common connector 136c that includes the same number of connector portions 204 as the number of phases of the winding assembly (e.g., three connector portions 204 for a three phase winding assembly) is utilized.

During construction of the winding assembly 124, the connector portions 204 of the winding connectors 136c and 136ph are each mechanically fixed to the corresponding windings 128 and then permanently electrically coupled, preferably via wave soldering, directly to each corresponding winding 128.

The winding assembly 124 also includes a power connector 136po that is utilized to electrically couple the winding assembly 124 to a power source. Each power connector 136po includes an outer portion 220 and an inner portion 224 (see FIGS. 14 and 15). In one embodiment, the outer portions 220 include a construction similar to the construction of the end clips 136e. Similar to the winding connectors 136ph and 136c discussed above, the outer portion 220 may be integral with the inner portion 224 or coupled to the inner portion 224, either permanently or removably.

Similarly, the inner portion 224 may be integral with a power bus or electrically coupled to a power bus, either permanently or removably. In one embodiment, the inner portion 224 is coupled to a power bus so that the power bus can be coupled to the power connector 136po after the power connector 136po is coupled to the single winding 128. The illustrated power connector 136po is coupled to a bolt structure 228 which can be considered to be part of the power bus or an intermediary between the power connector 136po and the power bus. The power bus may include a wire having an eyelet which is coupled to the bolt structure 228 with a nut.

In one embodiment, the power connectors 136po are formed of rigid electrically conductive element(s). In alternative embodiments, the power connector 136po can be formed of non-rigid electrically conductive element(s) or a combination of rigid and non-rigid element(s). Additionally, each power connector 136po can include a coating that electrically insulates at least a portion of the respective power connector 136po from the remainder of the winding assembly 124. Other arrangements are possible.

Figure 16:
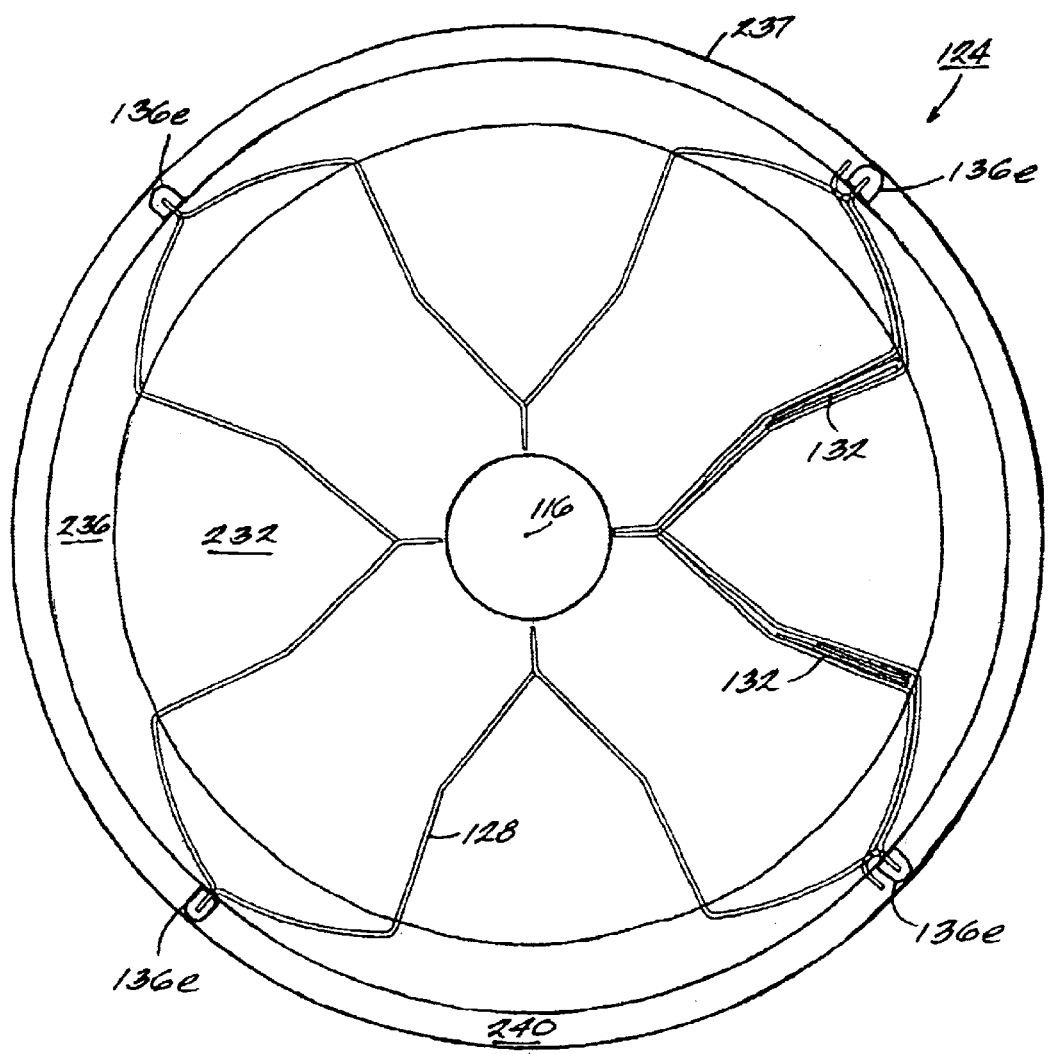
FIG. 16 schematically illustrates the winding assembly of FIG. 1.

As schematically shown in FIG. 16, the winding assembly 124 includes an inner region 232 situated radially outward of the axis 116, a middle region 236 situated radially outward of the inner region 232, and an outer region 240 situated radially outward of the inner region 232 and the middle region 236, and adjacent to the periphery 237 of the winding assembly 124. In some embodiments, the inner region includes the inner region 232 and the middle region 236. That is, the winding assembly can consist of an inner region and an outer region. The inner region 232 includes a portion of the windings 128 and the magnetically permeable element(s) 132. The middle region 236 includes a portion of the windings 128. The outer region 240 ("the wave solder zone") includes a portion of the windings 128 and the portion of the winding assembly 124 that comes in contact with the wave of solder during the wave soldering process. In one embodiment, the outer region 240 is approximately 6.35 mm long in the radial direction. In other embodiments, the outer region 240 may be larger or smaller, depending on the amount of solder necessary to form each of the wave soldered electrical connections.

Each winding connector 136ph and 136c is generally situated with respect to the windings 128 such that the connector portions 204 are located in the outer region 240 and the main portion 200 is located in the inner region 232 and/or the middle region 236 (see FIGS. 14 and 15). Similarly, each power connector 136po is generally situated with respect to the windings 128 such that the outer portion 220 is located in the outer region 240 and the inner portion 224 is located in the inner region 232 and/or the middle region 236 (see FIGS. 14 and 15). Accordingly, during a wave soldering process, the connector portions 204 and/or the outer portion 220 of each respective connector 136ph, 136c, 136po are wave soldered to the corresponding windings 128, and the main portion 200 and/or the inner portion 224 of each respective connector 136ph, 136c, 136po are not wave soldered to windings 128.

As shown in FIG. 14, the magnetically permeable element(s) 132 include stacked laminations of steel. The steel laminations are stacked and placed between each set of circumferentially adjacent windings 128. Preferably, the magnetically permeable element(s) 132 are electrically insulated from the windings 128. In other embodiments (e.g., the winding assembly 124 formed using the overall winding group 125 IJK), the steel laminations may be stacked and placed between only some sets of circumferentially adjacent windings.

Figure 17A:
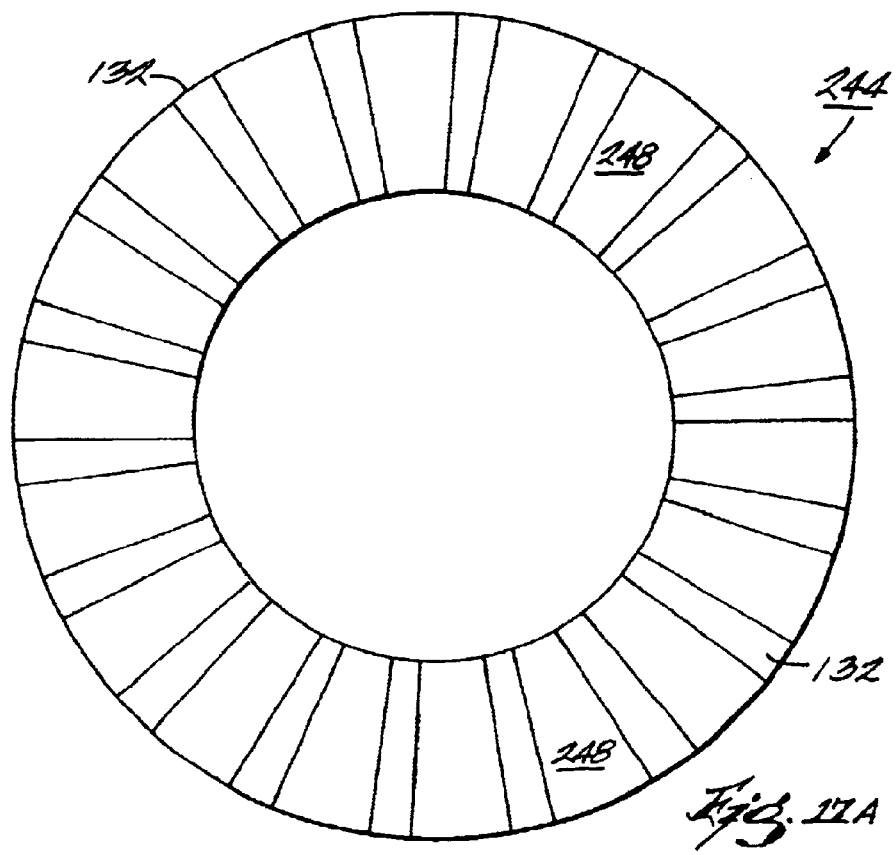
FIGS. 17A and 17B illustrate a core of magnetically permeable elements.
Figure 17B:
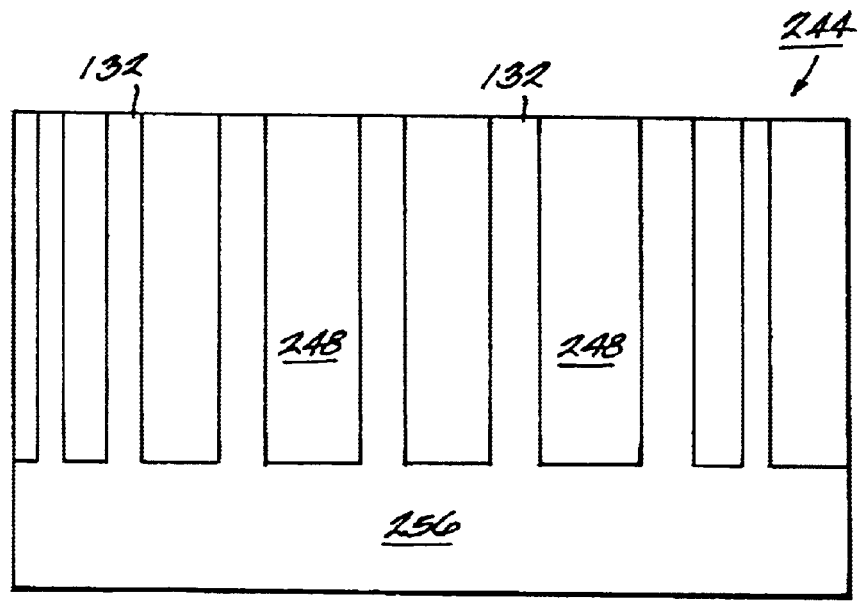

As illustrated in FIGS. 17A and 17B, a core 244 made of magnetically permeable material can be utilized instead of stacked laminations of steel to provide a path for the magnetic flux of the motor 100. The core 244 includes a plurality of winding gaps 248 that are adapted to accept at least one winding, a plurality of spaced magnetically permeable elements 132 that create the gaps 248, and a flux plate 256 that provides a return path for the magnetic flux. In some embodiments, the flux plate 256 is removed after the winding assembly 124 is assembled (e.g., the flux plate 256 is cut off to provide a rotor for a two stator, one rotor electrical machine). In some embodiments, the core 244 is utilized with the overall winding group 125IJK and connectors similar to the connectors 136 to form the winding assembly 124. The core 244 can be formed by rolling a stamped lamination using a machine provided by Invensys Brook Crompton of the United Kingdom or by F. Boccadoro S. A. of Losone, Switzerland. In other embodiments, the core 244 may be stamped, cast, or otherwise formed.

Each winding assembly of the invention is preferably formed such that efficient operation of the electrical machine that includes the winding assembly is not compromised. Although many factors may contribute to the efficiency of an electrical machine, an electrical machine is generally most efficient when the interaction between the electric current and the magnetic field of the electrical machine is maximized. One way to increase the interaction between the electric current and the magnetic field is to decrease the size of each air gap of the electrical machine.

The winding assemblies of the invention provide a number of constructions which allow for minimally sized air gaps even when size and/or performance requirements of the winding assembly would otherwise necessitate placement of at least one electrical conduit in an air gap between a rotor and a stator of the electrical machine. The winding assemblies of the invention include electrical conduits situated adjacent to the air gap instead of in the air gap.

In one embodiment, at least one recess is provided near the periphery of a winding assembly to accommodate at least one of the winding connectors 136ph and 136c. Each recess may extend around any portion of a circumference of the winding assembly (e.g., the entire circumference, a fraction of the circumference, etc.). Preferably, each recess is sized to accommodate the height and width of each winding connector 136ph and 136c placed in the respective recess such that each winding connector 136ph and 136c does not extend into the air gap of the electrical machine or beyond an outer edge of the winding assembly. Preferably, each recess is sized to minimize the amount of winding element(s) removed from the winding assembly such that the design requirements of the electrical machine can be met.

FIGS. 1 and 14 illustrate each phase connector 136ph located in a stepped recess 300 on the side of the winding assembly 124 adjacent to the air gap of the motor 100. Such placement ensures the phase connectors 136ph do not interfere with the rotation of the rotor 120 or the shaft 116, while maintaining a minimally sized air gap. The recess 300 is situated in both the outer region 240 and a portion of the inner region 232 (e.g., the middle region 236) such that the connector portions 204 of each phase connector 136ph can be wave soldered to the corresponding windings 128, and the main portion 200 of each phase connector 136ph is not wave soldered. In alternative embodiments, at least one recess similar to the recess 300 may be provided on the side of the winding assembly opposite the side adjacent to the air gap such that the winding connectors 136ph, 136c do not interfere with other parts of the electrical machine.

In another embodiment, at least one recess is provided radially inward of the periphery of a winding assembly to accommodate at least one winding connector 136ph or 136c. Similar to the recess 300, each recess can extend around any portion of the circumference of the winding assembly. Preferably, each recess is sized to accommodate the height and width of each winding connector 136ph and 136c placed in the respective recess such that each winding connector 136ph and 136c does not extend into the air gap of the electrical machine. Preferably, each recess is sized to minimize the amount of winding element(s) removed from the winding assembly such that the design requirements of the electrical machine can be met.

Figure 18:
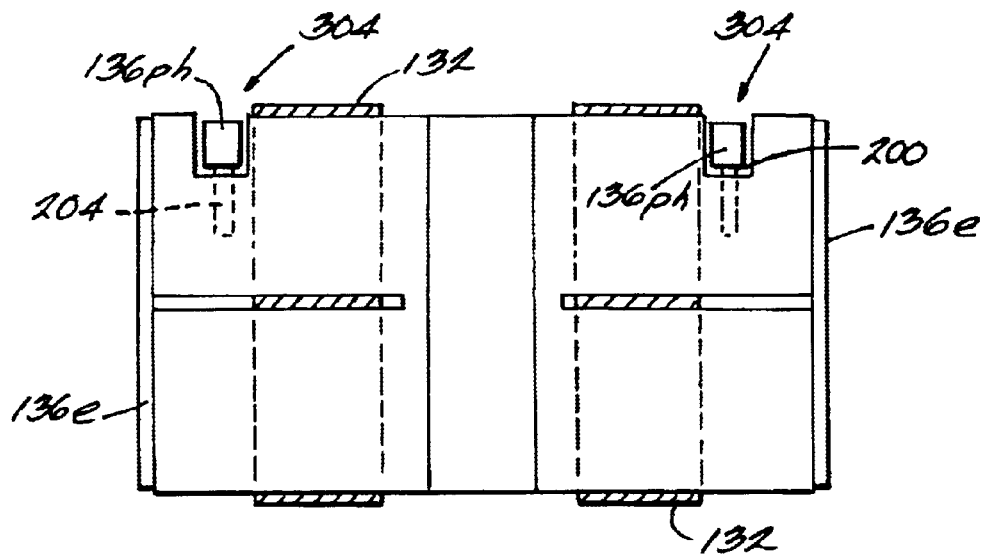
FIG. 18 illustrates a winding assembly having a recess.

FIG. 18 illustrates the phase connectors 136ph located in a recess 304 on the side of the winding assembly 124 adjacent to the air gap of the motor 100. Such placement ensures the phase connectors 136ph do not interfere with the rotation of the rotor 120 or the shaft 116, while maintaining a minimally sized air gap. The recess is situated in the inner region 232 in a location radially outward of the magnetically permeable elements 132 (e.g., in the middle region 236). Because no portion of the phase connectors 136ph is located in the outer periphery 240, the connector portions 204 of the phase connectors 136ph may not be wave soldered to the corresponding windings 128, and thus must be manually soldered or otherwise electrically coupled to the corresponding windings 128. In one embodiment, a potting compound is utilized to permanently electrically couple the phase connectors 136ph to the corresponding windings 128. In alternative embodiments, recesses similar to the recess 304 may be provided on the side of the winding assembly opposite the side adjacent to the air gap.

In another embodiment, the magnetically permeable element(s) 132 are extended through a plane 310 towards the corresponding magnetically-coupled elements or magnets 140 to decrease the size of the air gap (e.g., where the air gap is defined by the gap formed between the magnetically permeable element(s) 132 and the magnets 140. The plane 310 is defined by a plurality of edges 314 of a plurality of windings 128, respectively, where each edge 314 is the edge of the respective winding 128 which is adjacent to the air gap. The magnetically permeable element(s) 132 are preferable extended to accommodate at least the height of any winding connector 136*ph*, 136*c* extending above the edge of the windings 128 adjacent to the air gap.

Figure 19:
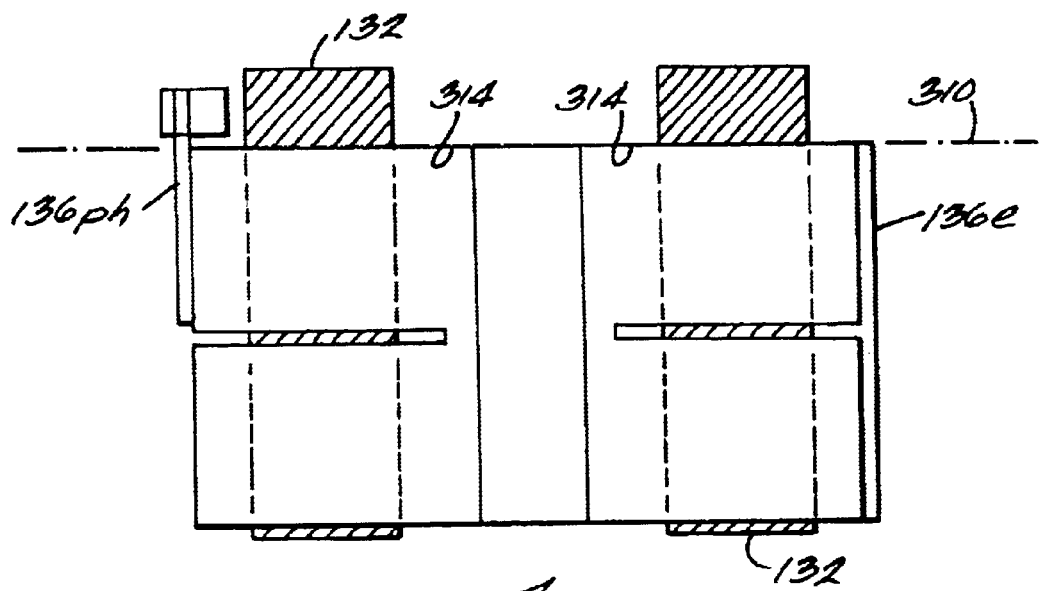
FIG. 19 illustrates a winding assembly having axially extending magnetically permeable element(s).

FIG. 19 illustrates the magnetically permeable element(s) 132 extended above the plane 310 such that the phase connectors 136*ph* do not interfere with the rotation of the rotor 120 or the shaft 116. In some embodiments, at least the portion(s) of the magnetic permeable element(s) 132 extended above the edges of the windings 128 are potted using a potting compound to provide structural integrity to the magnetic permeable element(s) 132, thereby reducing the tendency of the magnetic permeable element(s) 132 to vibrate during operation of the electrical machine.

In one embodiment, the winding assembly 124 is manufactured as follows. First, the overall winding group 125ABC is formed using the windings 128. The magnetically permeable element(s) 132 are then situated with respect to the windings 128 of the overall winding group 125ABC. Next, axially adjacent windings 128 are mechanically fastened using the end clips 136*c*, non-axially adjacent windings 128 are mechanically fasten using the winding connectors 136*ph* and 136*c*, and windings that need to be coupled to the power source are mechanically fastened to power the connectors 136*po*. Once all the connectors are mechanically coupled, the assembly is wave soldered to produce the winding assembly 124. After the wave soldering process is complete, the winding assembly 124 includes a number of phases that are electrically coupled in accordance with the design of the motor 100. Each phase is then connected to the power source by electrically coupling each power connector 136*po* to a power source.

The motor 100 is formed using the winding assembly 124 in the stator 108. In one embodiment, the winding assembly 124 is fastened to the housing 104 using a press fit hub. In another embodiment, the winding assembly 124 is placed in the housing 104 and encapsulated with a potting compound. The potting compound mechanically fastens the winding assembly 124 to the housing 104 while providing added benefits such as dissipation of heat from the winding assembly 124 and sealing of the winding assembly 124 from environmental factors such as water and dirt. The remaining components of the motor 100 are assembly and the motor 100 is operated as discussed above.

Thus, the invention provides, among other things, new and useful winding assemblies for an electric machine. Various features and advantages of the invention are set forth in the following claims.

What is claimed is:

1. A winding assembly for an electrical machine having an axis, the winding assembly having an inner region situated radially outward of the axis and an outer region situated radially outward of the inner region, the winding assembly comprising:
    a first winding having a first portion situated in the outer region;
    a second winding having a second portion situated in the outer region;
    a third winding having a third portion situated in the outer region; and
    a conduit electrically coupled directly to the first and third portions via at least one wave soldered connection, wherein
        the first and third portions form an acute angle with respect to the axis, and
        the second portion is situated in the acute angle.

2. The winding assembly of claim 1, wherein the electrical machine includes an electric motor.

3. The winding assembly of claim 2, wherein the electric motor is a brushless DC, axial air gap, three phase electric motor.

4. A winding assembly for an electrical machine having an axis, the winding assembly having an inner region situated radially outward of the axis and an outer region situated radially outward of the inner region, the winding assembly comprising:
    a first winding having a first portion situated in the outer region;
    a second winding having a second portion situated in the outer region;
    a third winding having a third portion situated in the outer region; and
    a conduit electrically coupled directly to the first and third portions via at least one wave soldered connection, wherein
        the first and third portions form an acute angle with respect to the axis,
        the second portion is situated in the acute angle, and
    wherein the conduit includes a main portion, and first and second connector portions, wherein the first and second connector portions are coupled directly to the first and third portions, respectively, via at least one wave soldered connection, and wherein the main portion couples the first and second connector portions.

5. The winding assembly of claim 4, wherein the first and second connector portions are integral with the main portion.

6. The winding assembly of claim 4, wherein the first and second connector portions are removably coupled to the main portion.

7. The winding assembly of claim 4, wherein the first and second connector portions are permanently coupled to the main portion.

8. The winding assembly of claim 7, wherein the first and second connector portions are permanently coupled to the main portion via at least one of a solder connection and a weld.

9. The winding assembly of claim 4, wherein the conduit further includes a third connector portion, wherein the third connector portion is coupled directly to the third portion via a wave soldered connection.

10. The winding assembly of claim 4, wherein the electrical machine includes at least first and second phases, and wherein the first portion includes a common portion of the first phase and the third portion includes a common portion of the second phase.

11. The winding assembly of claim 4, wherein the electrical machine has at least a first phase, and wherein the first portion includes a portion of a negative half phase of the first phase and the second portion includes a portion of a positive half phase of the first phase.

12. The winding assembly of claim 4, wherein the first and second connector portions are situated in the outer region, and wherein a majority of the main portion is situated in the inner region.

13. The winding assembly of claim 1, wherein the conduit includes a rigid conduit.

14. The winding assembly of claim 1, wherein the electrical machine has at least a first phase, and wherein the winding assembly further comprises:
    a fourth winding having a fourth portion situated in the outer region, the first phase including the first and fourth windings; and
    a power connector having an outer portion situated in the outer region and an inner portion situated in the inner region, wherein the outer portion of the power connector is electrically coupled directly to the fourth portion via a wave soldered connection, and wherein the inner portion is adapted to be electrically coupled to a power source associated with the electrical machine.

15. The winding assembly of claim 1, wherein the winding assembly forms an air gap with a magnetically-coupled element, and wherein the winding assembly has a recess extending to the periphery of the winding assembly in a side facing the air gap, the recess receiving at least a portion of the conduit.

16. The winding assembly of claim 1, further comprising a magnetically permeable element situated between the first and second windings, wherein the first and second windings define a plane, and wherein at least a portion of the magnetically permeable element extends through the plane in a direction toward a magnetically-coupled element.

17. A winding assembly for an electrical machine having an axis and at least first and second phases, the winding assembly having an inner region situated radially outward of the axis and an outer region situated radially outward of the inner region, the winding assembly comprising:
  first and second windings defining in part the first phase, at least a portion of the second winding being adjacent to at least a portion of the first winding;
  a connector electrically coupled directly to the first and second windings via a wave soldered connection;
  a third winding defining in part the second phase; and
  a rigid conduit electrically coupled directly to the first and third windings, a majority of the rigid conduit being situated in the inner region.

18. The winding assembly of claim 17, wherein the electrical machine includes an axial air gap, three phase electric motor.

19. The winding assembly of claim 17, wherein the first winding includes a common portion of the first phase and the third winding includes a common portion of the second phase.

20. The winding assembly of claim 17, wherein the rigid conduit includes a main portion and first and second connector portions, wherein the first and second connector portions are electrically coupled directly to the first and third windings, respectively, and wherein the main portion couples the first and second connector portions.

21. The winding assembly of claim 20, wherein the first and second connector portions are electrically coupled directly to the first and third windings, respectively, via at least one wave soldered connection.

22. The winding assembly of claim 20, wherein the first and second connector portions are integral with the main potion.

23. The winding assembly of claim 20, wherein the first and second connector portions are removably coupled to the main portion.

24. The winding assembly of claim 20, wherein the first and second connector portions are permanently coupled to the main portion.

25. The winding assembly of claim 24, wherein the first and second connector portions are permanently coupled to the main portion via at least one of a solder connection and a weld.

26. The winding assembly of claim 17, wherein the electrical machine having at least first, second, and third phases, wherein the winding assembly further comprises a fourth winding defining in part the third phase, wherein the rigid conduit includes a main portion and first, second, and third connector portions, wherein the first, second, and third connector portions are electrically coupled directly to the first, second, and third windings, respectively, and wherein the main portion electrically couples the first, second, and third connector portions.

27. The winding assembly of claim 26, wherein the first, second, and third connector portions are electrically coupled directly to the first, second, and third windings, respectively, via at least one wave soldered connection.

28. The winding assembly of claim 17, wherein the winding assembly forms an air gap with a magnetically-coupled element, and wherein the winding assembly has a recess extending to the periphery of the winding assembly in a side facing the air gap, the recess receiving at least a portion of the conduit.

29. The winding assembly of claim 17, further comprising a magnetically permeable element situated between the first and second windings, wherein the first and second windings define a plane, and wherein at least a portion of the magnetically permeable element extends through the plane in a direction toward a magnetically-coupled element.

30. The winding assembly of claim 17, wherein the winding assembly forms an air gap with a magnetically-coupled element, and wherein the winding assembly has a recess radially inward of the periphery of the winding assembly in a side facing the air gap, the recess receiving at least a portion of the conduit.

31. The winding assembly of claim 17, wherein the rigid conduit is electrically coupled directly to the first and third windings via at least one wave soldered connection.

32. A winding assembly for an electrical machine having an axis and at least a first phase, the winding assembly having an inner region situated radially outward of the axis and an outer region situated radially outward of the inner region, the winding assembly comprising:
  a first plurality of windings electrically coupled via at least one wave soldered connection in the outer region to form a first portion of the first phase, the first portion having a first IN terminal and a first OUT terminal;
  a second plurality of windings electrically coupled via at least one wave soldered connection in the outer region to form a second portion of the first phase, the second portion having a second IN terminal and a second OUT terminal; and
  a rigid conduit electrically coupled directly to the first OUT terminal and the second IN terminal, wherein
    the first OUT terminal and the second IN terminal form an acute angle with respect to the axis, and
    the second OUT terminal is situated in the acute angle.

33. The winding assembly of claim 32, wherein the first portion includes a negative half phase of the first phase and the second portion includes a positive half phase of the first phase.

34. The winding assembly of claim 32, wherein the electrical machine has at least first and second phases, and wherein the winding assembly further comprises:
  a third plurality of windings electrically coupled via at least one wave soldered connection in the outer region to form a third portion of the second phase, the third portion having a third IN terminal and a third OUT terminal;
  a fourth plurality of windings electrically coupled via at least one wave soldered connection in the outer region to form a fourth portion of the second phase, the fourth portion having a fourth IN terminal and a fourth OUT terminal; and
  a second rigid conduit electrically coupled directly to the third OUT terminal and the fourth IN terminal, wherein the third OUT terminal and the fourth IN terminal form an acute angle with respect to the axis, and the fourth OUT terminal is situated in the acute angle.

35. The winding assembly of claim 34, wherein the second rigid conduit is electrically coupled directly to the third OUT terminal and the fourth IN terminal via at least one wave soldered connection.

36. The winding assembly of claim 34, wherein the third portion includes a negative half phase of the second phase and the fourth portion includes a positive half phase of the second phase.

37. The winding assembly of claim 32, wherein the rigid conduit includes a main portion and first and second connector portions, wherein the first and second connector portions are coupled directly to the first OUT terminal and the second IN terminal, respectively, and wherein the main portion couples the first and second connector portions.

38. The winding assembly of claim 37, wherein the first and second connector portions are coupled directly to the first OUT terminal and the second IN terminal, respectively, via at least one wave soldered connection.

39. The winding assembly of claim 37, wherein the first and second connector portions are integral with the main portion.

40. The winding assembly of claim 37, wherein the first and second connector portions are removably coupled to the main portion.

41. The winding assembly of claim 37, wherein the first and second connector portions are permanently coupled to the main portion.

42. The winding assembly of claim 37, wherein the first and second connector portions are permanently coupled to the main portion via at least one of a solder connection and a weld.

43. The winding assembly of claim 32, wherein the winding assembly forms an air gap with a magnetically-coupled element, and wherein the winding assembly has a recess extending to the periphery of the winding assembly in a side facing the air gap, the recess receiving at least a portion of the conduit.

44. The winding assembly of claim 32, further comprising a magnetically permeable element situated between a first winding of the first plurality of windings and a second winding of the second plurality of windings, wherein the first and second windings define a plane, and wherein at least a portion of the magnetically permeable element extends through the plane in a direction toward a magnetically-coupled element.

45. The winding assembly of claim 32, wherein the winding assembly forms an air gap with a magnetically-coupled element, and wherein the winding assembly having a recess radially inward of the periphery of the winding assembly in a side facing the air gap, the recess receiving at least a portion of the conduit.

46. The winding assembly of claim 32, wherein the rigid conduit is electrically coupled directly to the first OUT terminal and the second IN terminal via at least one wave soldered connection.

47. A winding assembly for an electrical machine having an axis and at least a first phase, the winding assembly having an inner region situated radially outward of the axis and an outer region situated radially outward of the inner region, the winding assembly comprising:

a winding defining in part the first phase, the winding having an outer portion situated in the outer region;

a connector having an outer portion situated in the outer region and an inner portion situated in the inner region, the outer portion of the connector being electrically coupled directly to the outer portion of the winding via a wave soldered connection, and the inner portion being adapted to electrically couple the first phase to a power source associated with the electrical machine.

48. The winding assembly of claim 47, wherein the inner portion is integral with the outer portion.

49. The winding assembly of claim 47, wherein the inner portion is removably coupled to the outer portion.

50. The winding assembly of claim 47, wherein the inner portion is permanently coupled to the outer portion.

51. The winding assembly of claim 50, wherein the inner portion is permanently coupled to the outer portion via one of a solder connection and a weld.

52. The winding assembly of claim 47, wherein the inner portion is adapted to electrically couple the first phase to the power source via a conduit.

53. The winding assembly of claim 52, wherein the inner portion is integral with the conduit.

54. The winding assembly of claim 52, wherein the inner portion is removably coupled to the conduit.

55. The winding assembly of claim 52, wherein the conduit includes a bolt member and a wire, wherein the inner portion is removably coupled to the bolt member, and wherein the bolt member is electrically coupled to the wire member.

56. The winding assembly of claim 52, wherein the inner portion is permanently coupled to the conduit.

57. The winding assembly of claim 47, wherein the electrical machine has at least first and second phases, and wherein the winding assembly further comprises:

a second winding defining in part the second phase, the second winding having a second outer portion situated in the outer region; and a second connector having a second outer portion situated in the outer region and a second inner portion situated in the inner region, wherein the second outer portion of the second power connector is electrically coupled directly to the second outer portion of the second winding via a wave soldered connection, and wherein the second inner portion is adapted to be electrically coupled to the power source.

58. The winding assembly of claim 47, wherein the electrical machine includes an electric motor.

59. A winding assembly for an axial air gap electrical machine having an axis, a rotor adapted to rotate about the axis, a stator, and an air gap between the rotor and the stator, the winding assembly having a first side adjacent to the air gap, a second side opposite the first side, an inner region situated radially outward of the axis, a middle region situated radially outward of the inner region, and an outer region situated radially outward of the middle region, the winding assembly comprising:

a first winding having a first edge adjacent to the air gap, the first edge having a first notch;

a second winding having a second edge adjacent to the air gap, the second edge having a second notch; and a conduit electrically coupled directly to the first and second windings via at least one wave soldered connection in the outer region, wherein a majority of the conduit is situated in a recess at least partially defined by the first notch and the second notch, and wherein the recess extends to the periphery of the winding assembly.

60. The winding assembly of claim 59, wherein the recess is circumferentially extending.

61. The winding assembly of claim 60, wherein the recess extends around an entire circumference of the winding assembly.

62. The winding assembly of claim 59, wherein the recess is located radially outward of the inner region in the middle region and the outer region.

63. The winding assembly of claim 59, wherein the conduit includes a height defined in the axial direction and a width defined in the radial direction, and wherein the recess is sized to accommodate the height and the width of the conduit, respectively.

64. The winding assembly of claim 63, wherein the recess includes a height defined in the axial direction and a width defined in the radial direction, wherein the height and the width of the recess are substantially similar to the height and the width of the conduit, respectively.

65. The winding assembly of claim 59, wherein the conduit includes a rigid conduit.

66. The winding assembly of claim 59, wherein the conduit includes a main portion and first and second connector portions, wherein the first and second connector portions are electrically coupled directly to the first and second windings, respectively, via at least one wave soldered connection.

67. The winding assembly of claim 59, wherein the electrical machine includes an electric motor.

68. A winding assembly for an axial air gap electrical machine having an axis, a rotor adapted to rotate about the axis, a stator, and an air gap between the rotor and the stator, the winding assembly having a first side adjacent to the air gap, a second side opposite the first side, an inner region situated radially outward of the axis, a middle region situated radially outward of the inner region, and an outer region situated radially outward of the middle region, the winding assembly comprising:
- a first winding having a first edge adjacent to the air gap, the first edge having a first notch between two opposed ends of the first edge;
- a second winding having a second edge adjacent to the air gap, the second edge having a second notch between two opposed ends of the second edge; and
- a conduit electrically coupled directly to the first and second windings, wherein a majority of the conduit is situated in a recess at least partially defined by the first notch and the second notch.

69. The winding assembly of claim 68, wherein the recess is circumferentially extending.

70. The winding assembly of claim 69, wherein the recess extends around an entire circumference of the winding assembly.

71. The winding assembly of claim 68, wherein the recess is located radially outward of the inner region and radially inward of the outer region in the middle region.

72. The winding assembly of claim 68, wherein the conduit includes a height defined in the axial direction and a width defined in the radial direction, and wherein the recess is sized to accommodate the height and the width of the conduit, respectively.

73. The winding assembly of claim 72, wherein the recess includes a height defined in the axial direction and a width defined in the radial direction, and wherein the height and the width of the recess are substantially similar to the height and the width of the conduit, respectively.

74. The winding assembly of claim 68, wherein the conduit includes a rigid conduit.

75. The winding assembly of claim 68, wherein the conduit includes a main portion and first and second connector portions, wherein the first and second connector portions are electrically coupled directly to the first and second windings, respectively.

76. The winding assembly of claim 68, wherein at least a portion of the winding assembly is encapsulated in a potting compound.

77. The winding assembly of claim 68, wherein the electrical machine includes an electric motor.

78. A winding assembly for an axial air gap electrical machine having an axis, a rotor adapted to rotate about the axis, a stator, and an air gap between the rotor and the stator, the winding assembly having a first side adjacent to the air gap and a second side opposite the first side, the winding assembly comprising:
- a first winding having a first edge adjacent to the air gap;
- a second winding having a second edge adjacent to the air gap, the first and second edges defining a plane having a first surface facing the air gap and a second surface opposite the first surface;
- a conduit electrically coupled directly to the first and second windings, wherein a majority of the conduit is situated axially adjacent to the first surface, and wherein the conduit has a height defined in the axial direction; and
- a magnetically permeable element situated between the first and second windings, wherein at least a portion of the magnetic permeable element extends axially through the plane at least as far as the height of the electrical conduit.

79. The winding assembly of claim 78, wherein the magnetically permeable element includes an axially extending steel lamination.

80. The winding assembly of claim 78, wherein the magnetically permeable element includes at least a portion of a core of magnetically permeable material.

81. The winding assembly of claim 78, wherein the conduit includes a rigid conduit.

82. The winding assembly of claim 78, wherein the conduit includes a main portion, and first and second connector portions, wherein the first and second connector portions are coupled directly to the first and second windings, respectively, via at least one wave soldered connection.

83. The winding assembly of claim 78, wherein the electrical machine includes an electric motor.

84. The winding assembly of claim 4, wherein the electrical machine includes an electric motor.

85. The winding assembly of claim 4, wherein the electric motor is a brushless DC, axial air gap, three phase electric motor.

86. The winding assembly of claim 1, wherein the second portion is completely situated in the acute angle.

87. The winding assembly of claim 1, wherein the first, second, and third portions are situated in first, second, and third substantially radial planes, respectively.

* * * * *